US008854536B2

(12) United States Patent
Ogasawara

(10) Patent No.: US 8,854,536 B2
(45) Date of Patent: Oct. 7, 2014

(54) EXTERNAL DEVICE OPERABLE IN SYNCHRONIZATION WITH CAMERA WIRELESSLY CONNECTED THERETO, AND CAMERA OPERABLE IN SYNCHRONIZATION WITH EXTERNAL DEVICE WIRELESSLY CONNECTED THERETO

(75) Inventor: Akira Ogasawara, Kawasaki (JP)

(73) Assignee: Nikon Corporation, Tokyo (JP)

( * ) Notice: Subject to any disclaimer, the term of this patent is extended or adjusted under 35 U.S.C. 154(b) by 975 days.

(21) Appl. No.: 12/320,199

(22) Filed: Jan. 21, 2009

(65) Prior Publication Data
US 2009/0135262 A1     May 28, 2009

Related U.S. Application Data

(63) Continuation of application No. PCT/JP2007/064788, filed on Jul. 27, 2007.

(30) Foreign Application Priority Data

Jul. 27, 2006  (JP) ................................. 2006-204753

(51) Int. Cl.
*H04N 5/222* (2006.01)
*H04N 5/225* (2006.01)
*H04N 5/235* (2006.01)
*G03B 15/05* (2006.01)
*G03B 15/02* (2006.01)
*H04N 5/232* (2006.01)
*H04J 3/06* (2006.01)

(52) U.S. Cl.
CPC .............. *G03B 15/05* (2013.01); *H04N 5/2256* (2013.01); *H04N 5/2354* (2013.01); *H04J 3/0638* (2013.01); *G03B 15/02* (2013.01)

USPC ..................... 348/371; 348/211.3; 348/211.5; 396/159

(58) Field of Classification Search
USPC .................................................. 348/370–371
See application file for complete search history.

(56) References Cited

U.S. PATENT DOCUMENTS 6,404,987 B1 *  6/2002  Fukui .............................. 396/56
6,718,135 B2 *  4/2004  Kawasaki et al. ............. 396/182
6,748,165 B2 *  6/2004  Ogasawara ..................... 396/56

(Continued)

FOREIGN PATENT DOCUMENTS

| JP | A-5-232550  | 9/1993  |
| JP | A-05-297438 | 11/1993 |

(Continued)

*Primary Examiner* — Ngoc-Yen Vu
(74) *Attorney, Agent, or Firm* — Oliff PLC

(57) ABSTRACT

The external device, for example, an electronic flash device, is wirelessly connectable to an information communication device, for example, a camera. The external device includes: a synchronization data creation unit that outputs synchronization data for synchronization of timing of processing related to photography; a packet creation unit that creates a communication packet including control information; and a packet output unit that outputs the communication packet to the exterior by wireless communication. The packet creation unit includes a packet reception unit that receives the communication packet; a detection unit that detects the synchronization data before all of the received communication packets received by the packet reception unit has been read in; and a signal output unit that outputs a synchronization signal used for establishing synchronization of the timing of the processing related to photography on the basis of detection by the detection unit of the synchronization data.

33 Claims, 15 Drawing Sheets

(56) References Cited

U.S. PATENT DOCUMENTS

| | | | |
|---|---|---|---|
| 7,336,313 B2* | 2/2008 | Watanabe et al. | 348/371 |
| 7,437,063 B2* | 10/2008 | Clark | 396/56 |
| 7,511,764 B2* | 3/2009 | Cooper et al. | 348/516 |
| 7,945,154 B2* | 5/2011 | Ogasawara | 396/157 |
| 8,320,446 B2* | 11/2012 | Ramamoorthy et al. | 375/240.01 |
| 2002/0127019 A1 | 9/2002 | Ogasawara | |
| 2003/0175025 A1 | 9/2003 | Watanabe et al. | |
| 2006/0072694 A1 | 4/2006 | Dai et al. | |
| 2007/0006269 A1* | 1/2007 | Huang et al. | 725/81 |
| 2008/0106621 A1* | 5/2008 | Jung et al. | 348/262 |
| 2009/0015654 A1* | 1/2009 | Hayashi | 348/14.02 |
| 2010/0209089 A1* | 8/2010 | King | 396/56 |
| 2012/0044371 A1* | 2/2012 | King | 348/211.2 |

FOREIGN PATENT DOCUMENTS

| | | |
|---|---|---|
| JP | A-6-194725 | 7/1994 |
| JP | A-6-267682 | 9/1994 |
| JP | A-08-292463 | 11/1996 |
| JP | A-9-93179 | 4/1997 |
| JP | A-11-175118 | 7/1999 |
| JP | A-2000-066272 | 3/2000 |
| JP | A-2000-89306 | 3/2000 |
| JP | A-2000-89309 | 3/2000 |
| JP | A-2000-286892 | 10/2000 |
| JP | B-3262874 | 12/2001 |
| JP | A-2002-318413 | 10/2002 |
| JP | A-2003-101840 | 4/2003 |
| JP | A-2003-243185 | 8/2003 |
| JP | A-2004-015875 | 1/2004 |
| JP | A-2004-029184 | 1/2004 |
| JP | A-2004-40185 | 2/2004 |
| JP | A-2004-048468 | 2/2004 |
| JP | A-2004-354873 | 12/2004 |
| JP | A-2005-70624 | 3/2005 |
| JP | A-2005-117614 | 4/2005 |
| JP | A-2005-173165 | 6/2005 |
| JP | A-2005-236532 | 9/2005 |
| JP | A-2006-108730 | 4/2006 |
| JP | A-2006-109433 | 4/2006 |
| JP | A-2006-186894 | 7/2006 |

* cited by examiner

| 4a | 4b | 4c | 4d | 4e | |
|---|---|---|---|---|---|
| PREAMBLE | SFD | FRAME LENGTH | FCF | DATA SEQUENCE NUMBER | ····· |

SYNCHRONIZATION
SIGNAL

FIG.5
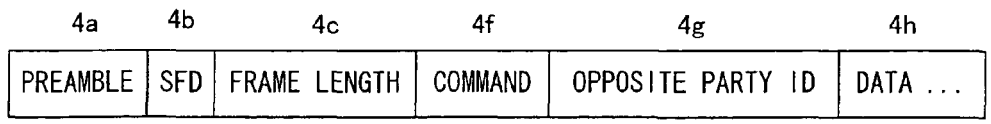
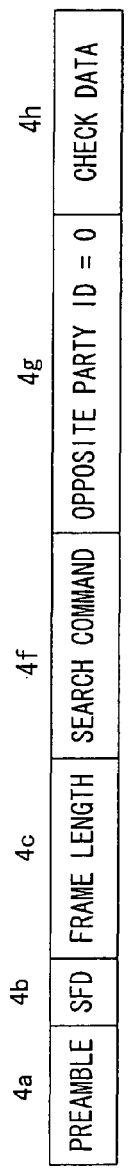
FIG.6

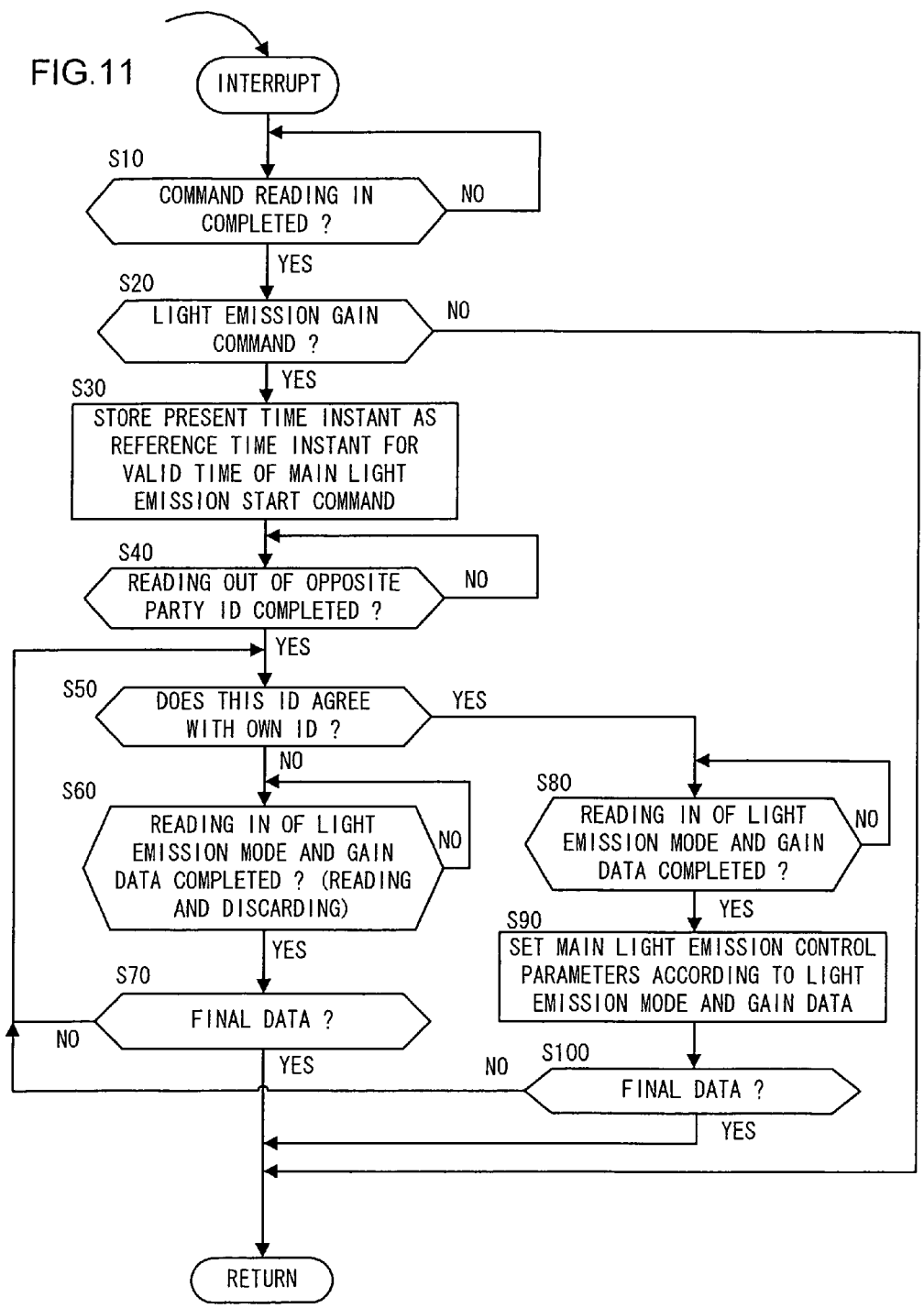

EXTERNAL DEVICE OPERABLE IN SYNCHRONIZATION WITH CAMERA WIRELESSLY CONNECTED THERETO, AND CAMERA OPERABLE IN SYNCHRONIZATION WITH EXTERNAL DEVICE WIRELESSLY CONNECTED THERETO

INCORPORATION BY REFERENCE

The disclosures of the following priority application and international application are herein incorporated by reference: Japanese Patent Application No. 2006-204753 filed Jul. 27, 2006; and International Application No. PCT/JP2007/064788 filed Jul. 27, 2007.

CROSS-REFERENCE TO RELATED APPLICATION(S)

This application is a continuation of International Application No. PCT/JP2007/064788 Jul. 27, 2007.

BACKGROUND OF THE INVENTION

1. Field of the Invention

The present invention relates to an external device to be connected to a camera upon use, to an electronic flash device, and to a camera.

2. Description of Related Art

The following type of wireless light increasing system is known. With this system, an auxiliary electronic flash device starts its own light emission operation upon detection of the light emission of a master electronic flash device that is connected to a camera. (Refer to Japanese Laid-Open Patent Publication H06-267682).

SUMMARY OF THE INVENTION

However such a conventional system starts measurement by a timer from the time when the light emission of the master electronic flash device is detected and accordingly it has been difficult to enhance the accuracy of synchronization of the light emission timing of the master electronic flash device on the side of the camera with the light emission timing of the auxiliary electronic flash device that is an external device.

According to a first aspect, the external device that is wirelessly connected to an information communication device, comprises: a synchronization data creation unit that outputs synchronization data used for establishing synchronization of timing of processing related to photography; a packet creation unit that creates a communication packet including control information; and a packet output unit that outputs the communication packet to the exterior by wireless communication, wherein the packet creation unit is adapted to create a communication packet including the synchronization data when the synchronization data creation unit has output the synchronization data, and includes a packet reception unit that receives the communication packet; a detection unit that detects the synchronization data before all of the communication packet received by the packet reception unit has been read in; and a signal output unit that outputs a synchronization signal used for establishing synchronization of the timing of the processing related to photography on the basis of detection by the detection unit of the synchronization data.

According to a second aspect, it is preferred that in the external device according to the first aspect, the synchronization data is specific data included in the communication packet and having a specific meaning, or is data that is after the specified data by a predetermined number of data.

According to a third aspect, it is preferred that in the external device according to the first aspect or the third aspect, the information communication device is a camera, and the external device further comprises: a processing execution unit for establishing synchronization, on the basis of the synchronization data, with processing related to photography that is executed on the side of the camera, that starts processing related to the photography that is executed on the side of the external device, after a time period that is set from when the signal output unit outputs the synchronization signal.

According to a fourth aspect, it is preferred that in the external device according to the third aspect, when the external device is an electronic flash device, the synchronization of timing of the processing related to photography is synchronization of the timing at which the camera opens a shutter with the timing at which the electronic flash device performs emission of light; and the processing execution unit starts light emission after the time period that has been set.

According to a fifth aspect, it is preferred that in the external device according to the third aspect, when the external device is an electronic flash device, the synchronization of timing of the processing related to photography is synchronization of the timing at which the camera starts photometry with the timing at which the electronic flash device starts a preparatory emission of light, before performing main light emission; and the processing execution unit starts preparatory light emission after the time period that has been set.

According to a sixth aspect, it is preferred that in the external device according to the third aspect, when the external device is an external camera, the synchronization of timing of the processing related to photography is synchronization of the timing at which the camera opens a shutter with the timing at which the external camera opens a shutter; and the processing execution unit opens the shutter after the time period that has been set.

According to a seventh aspect, it is preferred that in the external device according to the first aspect or the second aspect, the signal output unit includes a control circuit provided to the external device, the synchronization data detected by the detection unit is input to an interrupt terminal of the control circuit, and the signal output unit outputs the synchronization signal on the basis of the synchronization data having being input to the interrupt terminal of the control circuit.

According to an eighth aspect, it is preferred that in any one of the third aspect to the sixth aspect, information specifying the time period that has been set is included in the communication packet.

According to a ninth aspect, it is preferred that in the external device according to the fourth aspect, information specifying the time period that has been set is included in the communication packet.

According to a tenth aspect, it is preferred that in the external device according to the fourth aspect, the external device transmits to the camera a communication packet including information specifying conditions of light emission after the light emission has ended.

According to an eleventh aspect, it is preferred that in the external device according to the tenth aspect, the information that specifies the conditions of light emission is at least one of information that specifies that the electronic flash device has performed full light emission and information related to the difference between a target amount of light during light emission and the actual amount of light that has been emitted.

According to a twelfth aspect, the information communication device that is wirelessly connected to an external device, comprises: a packet reception unit that receives a communication packet including control information; a detection unit that detects synchronization data used for establishing synchronization of timing of processing related to photography before all of the communication packet received by the packet reception unit has been read in; and a signal output unit that outputs a synchronization signal used for establishing synchronization of the timing of the processing related to photography on the basis of detection by the detection unit of the synchronization data, the information communication device further comprises a synchronization data creation unit that outputs the synchronization data; a packet creation unit that creates the communication packet; and a packet output unit that outputs the communication packet to the exterior by wireless communication; wherein the packet creation unit creates the communication packet including the synchronization data when the synchronization data creation unit has output the synchronization data.

According to a thirteenth aspect, it is preferred that in the information communication device according to the twelfth aspect, the packet creation unit creates the communication packet including the synchronization data by putting specified data having a specific meaning, or by putting data expressing the synchronization data after the specific data.

According to a fourteenth aspect, it is preferred that in the information communication device according to the twelfth aspect or the thirteenth aspect, the information communication device is a camera; and the camera further comprises a processing execution unit that starts processing related to photography executed on the side of the camera on the basis of the synchronization data output by the synchronization data creation unit, in order to establish synchronization with processing related to photography executed on the side of the external device, after a set time period from when the external device outputs the synchronization signal.

According to a fifteenth aspect, it is preferred that in the information communication device according to the fourteenth aspect, when the external device is an electronic flash device, the synchronization of timing of the processing related to photography is synchronization of the timing at which the camera opens a shutter with the timing at which the electronic flash device performs emission of light, and the processing execution unit opens the shutter on the basis of the synchronization data output by the synchronization data creation unit.

According to a sixteenth aspect, it is preferred that in the information communication device according to the fourteenth aspect, when the external device is an electronic flash device, the synchronization of timing of the processing related to photography is synchronization of the timing at which the camera opens a shutter with the timing at which the electronic flash device performs emission of light, and the processing execution unit opens the shutter on the basis of the synchronization data output by the synchronization data creation unit.

According to a seventeenth aspect, it is preferred that in the information communication device according to the fourteenth aspect, when the external device is an external camera, the synchronization of timing of the processing related to photography is synchronization of the timing at which the camera opens a shutter with the timing at which the external camera opens a shutter, and the processing execution unit opens the shutter on the basis of the synchronization data output by the synchronization data creation unit.

According to an eighteenth aspect, it is preferred that in the information communication device according to any one of the fourteenth aspect to the seventeenth aspect, the processing execution unit includes a control circuit provided to the camera, the packet output unit includes a camera side detection unit that detects the synchronization data from the communication packet including the synchronization data, the synchronization data detected by the camera side detection unit is input to an interrupt terminal of the control circuit, and the processing execution unit determines a start timing for processing on the basis of the synchronization data, based upon the synchronization data detected by the camera side detection unit being input to the interrupt terminal of the control circuit.

According to a nineteenth aspect, it is preferred that in the information communication device according to any one the fourteenth aspect to the seventeenth aspect, the packet creation unit creates the communication packet including information that specifies the set time period.

According to a twentieth aspect, it is preferred that in the information communication device according to the twelfth aspect or the thirteenth aspect, when the external device includes a plurality of electronic flash devices, the packet creation unit creates the communication packet including either information for specifying each of the electronic flash devices individually, or information for specifying all of the electronic flash devices together.

According to a twenty first aspect, it is preferred that in the information communication device according to the fifteenth aspect, the packet output unit outputs a communication packet that commands the start of light emission within a predetermined valid time after outputting a communication packet including control information during light emission.

According to a twenty second aspect, it is preferred that in the information communication device according to the twelfth aspect or the thirteenth aspect, when a plurality of the external devices is present, the packet creation unit creates the communication packet including, in the communication packet, control information for controlling each of the electronic flash devices individually.

According to a twenty third aspect, it is preferred that in the information communication device according to the twenty second aspect, when the external device is an electronic flash device, the control information includes information specifying an amount of light to be emitted by each external device.

According to a twenty fourth aspect, it is preferred that the information communication device according to the fifteenth aspect further comprise: a request unit that requests the external device to transmit, after the light emission ends, a communication packet including information specifying conditions of light emission by the external device.

According to a twenty fifth aspect, it is preferred that in the information communication device according to the twenty fourth aspect, the information specifying the conditions of light emission is at least one of information that specifies that the electronic flash device has performed full light emission and information related to a difference between a target amount of light during light emission and an actual amount of light that has been emitted.

According to a twenty sixth aspect, the electronic flash device comprises: a packet reception unit that receives, from an information communication device that is wirelessly connected, a communication packet including control information and information for specifying an object of control; and a processing execution device that performs processing on the basis of the control information, if information is included in the communication packet received by the packet reception unit that specifies this electronic flash device as the object of control, wherein if a plurality of the electronic flash devices is present, the information that specifies an electronic flash device as the object of control is either information that specifies one of the electronic flash devices individually or information that specifies all the electronic flash devices together, and the processing execution unit starts preparatory light emission to be performed before main light emission, if information is included in the communication packet that specifies the electronic flash device individually, and performs the main light emission, if information is included in the communication packet that specifies all the electronic flash devices together.

According to a twenty seventh aspect, the external device comprises: a packet reception unit that receives, from an information communication device that is wirelessly connected, a first communication packet including first control information and a second communication packet including second control information; and a processing execution unit that executes processing on the basis of the first control information and the second control information, if the packet reception unit has received the second communication packet within a predetermined valid time after has received the first communication packet.

According to a twenty eighth aspect, the electronic flash device comprises: a packet reception unit that receives, from an information communication device that is wirelessly connected, a communication packet including control information; a processing execution unit that executes processing on the basis of the second control information, if the packet reception unit has received the communication packet; and a result transmission unit that transmits to the information communication device, as information specifying the result of execution of processing by the processing execution unit, information including at least one of information that specifies that the electronic flash device has performed full light emission and information related to the difference between a target amount of light during light emission and the actual amount of light that has been emitted.

According to a twenty ninth aspect, the external flash device comprises: a packet creation unit that creates a communication packet including control information; a packet output unit that outputs the communication packet that has been created by the packet creation unit; a packet reception unit that receives the communication packet and records it in a memory; and a packet analysis unit that starts to analyze information from the packet, the reception of which has been completed, before all of the communication packet that has been received by the packet reception unit has been recorded in the memory.

According to a thirtieth aspect, it is preferred that in the external device according to the twenty ninth aspect, the packet analysis unit includes: a detection unit that detects, from the packet that has been read in, synchronization data for synchronizing the timing of processing related to photography; and a signal output unit that outputs a synchronization signal for establishing synchronization with the timing of processing related to photography, when the synchronization data has been detected by the detection unit.

According to a thirty first aspect, it is preferred that in the information communication device according to the twelfth aspect, the packet creation unit creates a communication packet including control information, the packet output unit outputs the communication packet that has been created by the packet creation unit to a plurality of external devices that are wirelessly connected, and when a plurality of the external devices is present, the packet creation unit creates the communication packet and includes, within the communication packet, the control information for controlling each of the external devices individually.

According to a thirty second aspect, it is preferred that in the information communication device according to the thirty first aspect, when the external device is an electronic flash device, the control information is information specifying the amount of light emitted by each external device.

According to a thirty third aspect, it is preferred that the external device according to any one of the first aspect to the eleventh aspect further comprises a detachable wireless communication unit, including at least the packet reception unit, for performing wireless communication with the information communication device.

According to a thirty fourth aspect, it is preferred that the external device according to any one of the twenty sixth aspect to the thirtieth aspect further comprises a detachable wireless communication unit, including at least the packet reception unit, for performing wireless communication with the information communication device.

According to a thirty fifth aspect, it is preferred that the information communication device according to any one of the twenty sixth aspect to the twenty fifth aspect, the thirty first aspect, and the thirty second aspect further comprises a detachable wireless communication unit, including at least the packet output unit, for performing wireless communication with the external device.

BRIEF DESCRIPTION OF THE DRAWINGS

FIG. 5 is a diagram showing an example of a communication packet in which information defined specifically for this system is provided;

FIG. 6 is a diagram showing a concrete example of the search packet;

FIG. 11 is a flowchart showing processing performed by the remote electronic flash device 400 upon receipt of the light emission gain command packet;

DESCRIPTION OF PREFERRED EMBODIMENTS

Figure 1:
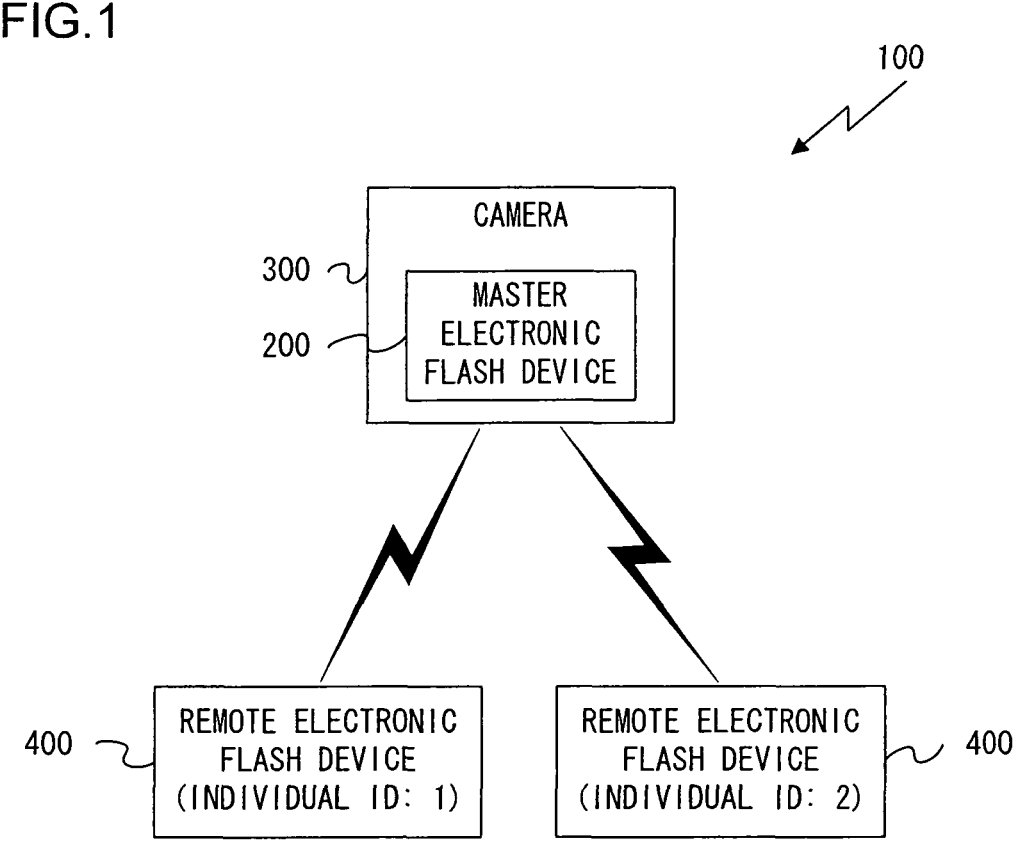
FIG. 1 is a block diagram showing the structure of a light emission control system according to an embodiment of the present invention.

FIG. 1 is a block diagram showing the structure of the light emission control system according to an embodiment of the present invention. In this light emission control system 100, a camera 300 to which an electronic flash device (a master electronic flash device) 200 is fitted and one or more external electronic flash devices (remote electronic flash devices) 400 are connected together via wireless communication using ICs for wireless communication via wireless LAN, Bluetooth, ZigBee or the like. It should be understood that this light emission control system 100 consists of a single camera 300 to which a master electronic flash device 200 is fitted and at least one remote flash device 400 that constitutes an external device. In FIG. 1, however, a concrete example is shown of a case that consists of a single camera 300 and two remote flash devices 400.

Figure 2:
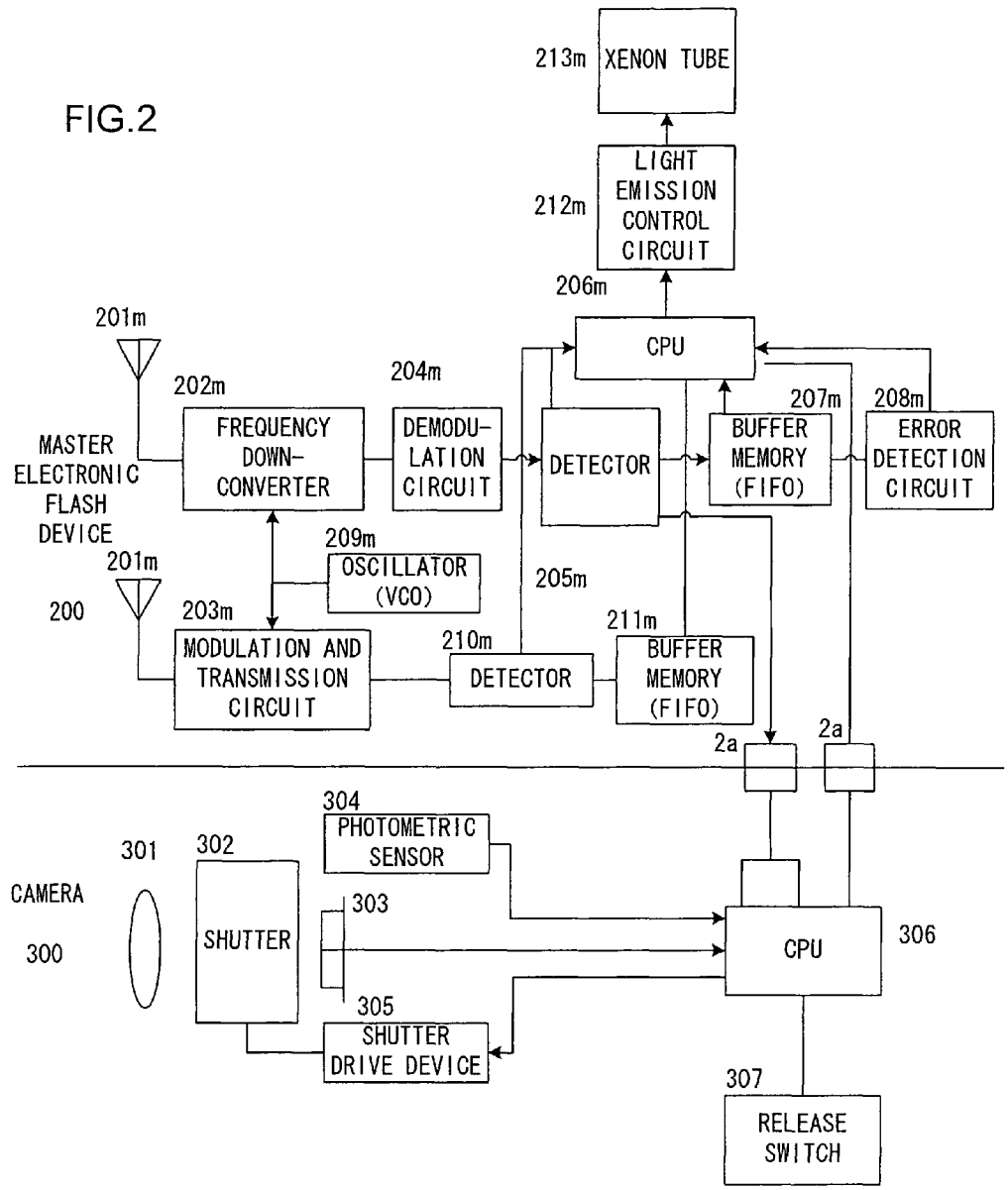
FIG. 2 is a block diagram of a camera 300 to which a master electronic flash device 200 is fitted.

A block diagram of this camera 300 with the master electronic flash device 200 fitted thereto is shown in FIG. 2. The master electronic flash device 200 and the camera 300 are connected together via X terminals 2a of a hot shoe that is mounted at the upper portion of the camera 300. Moreover, a block diagram of a remote electronic flash device 400 is shown in FIG. 3.

Figure 3:
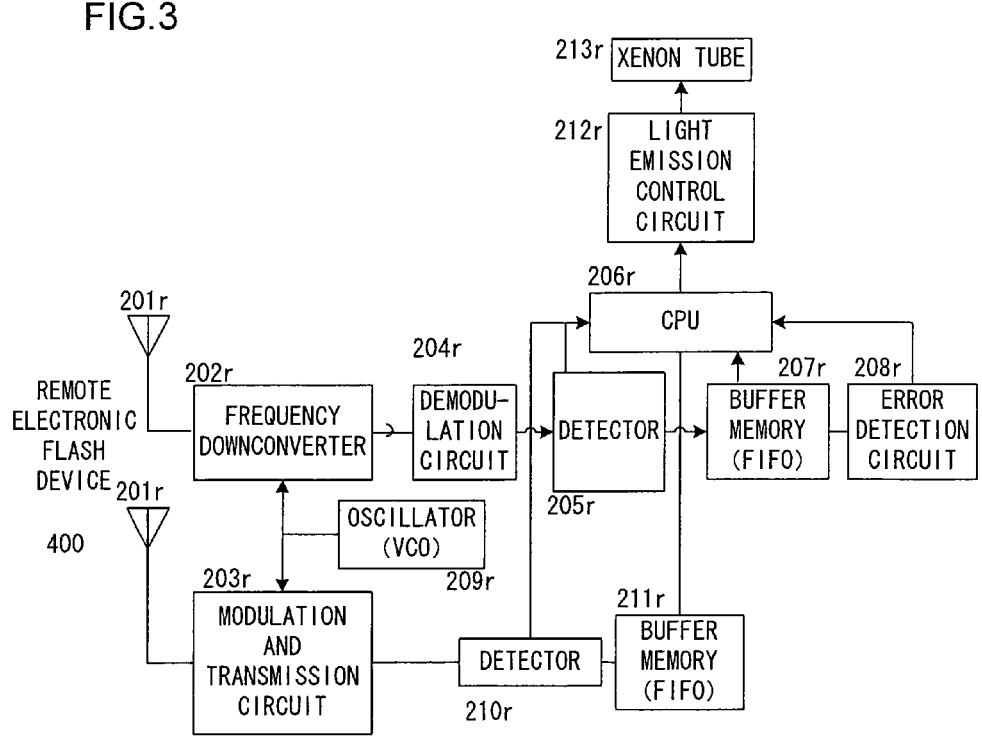
FIG. 3 is a block diagram of a remote electronic flash device 400.

It should be understood that, e the structures of the master electronic flash device 200 and the remote electronic flash device 400 are the same and accordingly, as shown in FIGS. 2 and 3, the numerical portions in the reference symbols that are appended to the various units that constitute them, are the same. They are distinguished by "m" being postfixed at the tail ends of the reference symbols appended to the various units in the case of the master electronic flash device 200 and "r" being postfixed in the case of the remote electronic flash device 400. In this embodiment, the structure of the master electronic flash device 200 will be explained as a representative, and explanation of the structure of the remote electronic flash device 400 will be omitted.

The master electronic flash device 200 includes an antenna 201m, a frequency downconverter 202m, a modulation and transmission circuit 203m, a demodulation circuit 204m, detectors 205m and 210m, a CPU 206m, buffer memories 207m and 211m, an error detection circuit 208m, an oscillator 209m, a light emission control circuit 212m, and a xenon tube 213m. The camera 300 includes a lens 301, a shutter 302, an image sensor 303, a photometric sensor 304, a shutter drive device 305, a CPU 306, and a release switch 307.

Here, the antenna 201m~ the buffer memory 211m included in the master electronic flash device 200 (except for the CPU 206m) constitute a wireless module for wireless communication with the remote electronic flash device(s) 400. In other words, in the example shown in FIG. 2, in this camera 300 to which the master electronic flash device 200 is fitted, the master electronic flash device is equipped with a wireless module. However, it should be understood that, if the master electronic flash device 200 is not provided with any wireless module, but rather a wireless module is provided to the camera 300, then it is possible to perform wireless communication with the remote electronic flash device(s) 400 via this wireless module fitted to the camera 300. Moreover, if wireless modules are provided to both the master electronic flash device 200 and the camera 300, then it is possible to perform wireless communication with the remote electronic flash device(s) 400 via either one of these wireless modules, for example, via the wireless module fitted to the camera 300.

Thus, with this light emission control system 100 that includes the camera 300 to which the master electronic flash device 200 is fitted and the remote electronic flash device(s) 400, it is necessary to synchronize the timing of opening of the shutter 302 and capture by the image sensor 303 of an image of the photographic subject input via the lens 301 when the release switch 307 of the camera 300 is depressed by the user, the timing of light emission by the master electronic flash device 200, and the timing of light emission by all of the remote electronic flash devices 400. Moreover if, a preparatory light emission (i.e. a monitor light emission) is to be performed before the light emission for actual photography (i.e. the main light emission) in order to determine the amount of light emitted during photography by each of the remote electronic flash devices 400, then it is necessary to synchronize the timings of light emission by each of the remote electronic flash devices 400 with the photometry by the photometric sensor 304.

Figure 4:
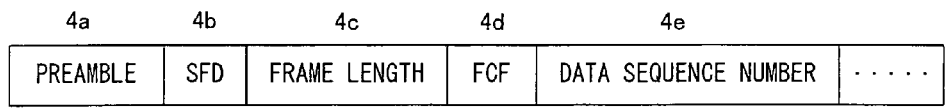
FIG. 4 is a diagram showing an example of a communication packet that conforms to a digital communication format.

Due to this, the CPU 206m of the master electronic flash device 200 in this embodiment issues commands to the remote electronic flash device(s) 400 for causing it to perform monitor light emission and main light emission on the basis of commands from the CPU 306 of the camera 300. At this time, the CPU 206m creates communication packets that conform to a format for digital communication, and that include signals for synchronizing the timings of the main light emissions and the timings of the monitor light emissions (synchronization data), and information specifying the details of control. The CPU 206m may, for example, create communication packets of a format like that shown in FIG. 4. In FIG. 4, a preamble 4a is data like a preparatory portion that is transmitted before communication, and transmission of such a preamble of around 4 bytes is compulsory. In this preamble 4a, for example, a fixed bit pattern like "0, 0, 0, 0" is set.

A SFD (Start of Frame Delimiter) is data for synchronization that is appended to the header portion of the packet. A frame length 4c is data that specifies the data size for communication (i.e. the number of bytes). Thereafter, according to the standard, a two byte FCF (Frame Control Field) 4d and a one byte Data Sequence Number 4e should next be appended. However, since communication is possible even without perfect conformity to the standard, this FCF 4d and Data Sequence Number 4e are omitted in this embodiment, and instead, as shown in FIG. 5, there are appended a one byte command 4f that is defined specifically for this system, a one byte ID of the opposite party, and data 4h that includes various kinds of information.

The SFD 4b is, in principle, fixed data that is specific for this communication method, and operates to prevent erroneous operation if signals for some other communication should interfere with the signals for this communication. In other words, if, on the reception side, the receiving device receives a communication packet including an SFD that does not agree with the data pattern of SFD that is set in advance, then it decides that this packet is not a packet that it should itself receive. In this embodiment, the CPU 306 of the camera 300, the CPU 206m of the master electronic flash device 200 and the CPU(s) 206r of the remote electronic flash device(s) 400 use the SFD 4b with the objective of prevention of erroneous operation when this type of signal interference takes place, and also use it as synchronization data for establishing synchronization, as explained above, between the timing of main light emission by the master electronic flash device 200, the timing(s) of main light emission(s) by the remote electronic flash device(s) 400, and the timing of opening of the shutter 302 of the camera 300. In a similar manner, the SFD 4*b* is used as synchronization data for establishing synchronization between the timing of monitor light emission by each of the remote electronic flash devices 400 and the timing of photometry by the photometric sensor 304.

In concrete terms, on the transmission side, the transmitting device outputs a synchronization signal for establishing synchronization at the timing that the SFD 4*b* is transmitted, while on the reception side the receiving device(s) output(s) synchronization signal(s) at the timing that the SFD 4*b* is received. And by executing on both the transmission side and the receiving side a command defined in a command 4*f* that will be described herein after, after a set predetermined time period from when this synchronization signal is output, it is possible to make the timings of the starts of processing upon the transmission side and the reception side agree with one another.

Here, a certain delay time period (i.e. a reception delay time period) for decoding and the like occurs on the reception side as compared to the transmission side. Accordingly, the timing A of completion of reception of the SFD 4*b* on the reception side is delayed after the timing B of completion of transmission of the SFD 4*b* on the transmission side, and there is a possibility that both the timings do not agree perfectly with one another. However, there will be no problem even if this delay time period is ignored, since it is an extremely minute interval. Furthermore, even if a delay time period of a length that cannot be ignored occurs, it is possible to make the timing of the start of processing upon the transmission side and the start of processing upon the reception side are made to agree with one another by setting this delay time period in advance as a constant value since this delay time period is an interval that is almost constant, and by adjusting the execution timing of commands that are defined in the command 4*f* in consideration of this delay time period.

It should be understood that although in this embodiment, a method is explained in which the timing of the start of processing upon the transmission side and the timing of the start of processing upon the reception side are made to agree with each another on the basis of the timings A and B of completion of transmission and reception of the SFD 4*b*, it would also be acceptable to arrange to make the timing of the start of processing upon the transmission side and the timing of the start of processing upon the reception side agree with one another on the basis of the timing of completion of transmission and reception of the frame length 4*c*.

The command 4*f* is data that specifies a control command for starting processing. For example, data specifying a main light emission start command may be appended as the command 4*f* to a communication packet that commands execution of the above described main light emission (i.e. a main light emission starting packet). Moreover, data that specifies a monitor light emission start command may be appended as a command 4*f* to a communication packet that commands execution of the above described monitor light emission (i.e. a monitor light emission starting packet). The opposite party ID 4*g* includes the ID of the remote electronic flash device 400 that is to be the subject of execution of the control command defined by the command 4*g*. In other words, the remote electronic flash device 400 that is designated by the opposite party ID 4*g* is commanded to execute the control command that is defined by the command 4*f*.

It should be understood that IDs (individual IDs) are appended to the respective remote electronic flash devices 400, and each of these remote electronic flash devices 400 can be designated as desired with this individual ID. Accordingly, it is possible to uniquely specify this individual ID in the opposite party ID 4*g*, and thus to designate the subject of execution of the command 4*f*. Moreover, instead of this individual ID, it would also be possible to specify an ID (an all-device ID) for designating all of the remote electronic flash devices 400 as execution subjects for the command 4*f*. For example, if the individual IDs of the two remote electronic flash devices 400 shown in FIG. 1 are "1" and "2", it is possible to specify "0" as the all-device ID when referring to them together. Moreover, for example, "M" may be appended to the master electronic flash device 200 as an ID that designates the master electronic flash device 200.

Due to this, if it is desired that all of the remote electronic flash devices 400 should execute the same command, then it is possible to command all of the remote electronic flash devices 400 as a group to execute the control command that is defined by the command 4*f* by specifying the all-device ID as the opposite party ID 4*g*. In other words, if the individual ID of a remote electronic flash device 400 that has received a communication packet is included in the opposite party ID 4*g*, or if the all-device ID is included therein, then it recognizes that the subject of execution of the control command that is defined by the command 4*f* is itself.

The type of the data 4*h* may be mode information, time period information, check data, or the like. Mode information is information that designates an operational mode, such as a light emission mode specifying main light emission or monitor light emission or the like. Time period information is information related to a predetermined time period from the output of the synchronization signal until processing starts. The check data is data for error checking, such as a checksum or a CRC or the like for preventing erroneous operation.

A communication packet that has been created by the CPU 206*m* of the master electronic flash device 200 is temporarily stored in the buffer memory 211*m*, and then it is output to the detector 210*m*. The detector 210*m* reads in and analyzes the packet that has been input, from its head to tail. The detector 210*m* outputs a synchronization signal to the CPU 206*m* when it has detected that the reading in of the SFD 4, that constitutes the synchronization data, has been completed it. In other words, the detector 210*m* detects the synchronization data before the transmission of the communication packet has been completed. The detector 210*m* outputs this synchronization signal to a pin for synchronization timing (an interrupt terminal) of the CPU 206*m* as an interrupt signal. The CPU 206*m* outputs a synchronization signal via the X terminals 2*a* to a pin for synchronization timing (an interrupt terminal) of the CPU 306, as an interrupt signal.

The CPUs 206*m* and 306 start timing when they have detected the synchronization signal interrupts. And the CPU 206*m* decides whether or not it is necessary to synchronize the starts of processing by the master electronic flash device 200 and the camera 300, on the basis of the command 4*f* included in the communication packet that is created. As a concrete example, a case will be explained in which the command 4*f* is data that specifies a main light emission command. In this case, it is necessary to make the timing of light emission by the master electronic flash device 200 and the timing of opening of the shutter 302 of the camera 300 agree with one another. Accordingly, the CPU 206*m* creates a main light emission command on the basis of the command from the CPU 306 of the camera 300, and decides that it is necessary to synchronize the starts of processing by the master electronic flash device 200 and the camera 300.

If the CPU 206*m* has decided that it is necessary to synchronize the starts of processing by the master electronic flash device 200 and the camera 300, then it starts the processing required on the basis of the command 4*f*, after a predetermined time period that is set in advance has elapsed from detection of the synchronization signal from the detector 210*m*. For example, if the command 4*f* is data that specifies a main light emission command, then the CPU 206*m* commands the light emission control circuit 212*m* to start main light emission after the above described predetermined time period has elapsed from the detection of the synchronization signal interrupt. After the above described predetermined time period has elapsed from the detection of the synchronization signal interrupt, the CPU 306 commands the shutter drive device 306 to open the shutter 302. Due to this, it is possible to enhance the accuracy of synchronization between the timings at which processing by the master electronic flash device 200 and processing by the camera 300 are started. It should be understood that the shutter 302 that is provided to the camera 300 may not be a mechanical shutter; it may also be an electronic shutter of the image sensor.

On the other hand, if it has been decided that it is not necessary to synchronize the starts of processing by the master electronic flash device 200 and the camera 300, then the CPU 206*m* does not command the light emission control circuit 212*m* to start processing.

Moreover, the communication packet is output from the detector 210*m* to the modulation and transmission circuit 203*m*, and, after this communication packet has been modulated by the modulation and transmission circuit 203*m* to a signal that can be wirelessly transmitted at a predetermined frequency, it is output in the form of a carrier wave to the remote electronic flash device(s) 400 via the antenna 201*m*. This predetermined frequency is determined by the oscillator 209*m*. The remote electronic flash device(s) 400 receive this communication packet in the form of a carrier wave via antenna(s) 201*r*.

In a remote electronic flash device 400, the carrier wave is first input to a frequency downconverter 202*r*. After the packet that has been received has been converted by the frequency downconverter 202*r* to a signal of a predetermined low frequency, it is output to a demodulation circuit 204*r*. This predetermined frequency is determined by an oscillator 209*r*. The signal that has been input is demodulated into a digital communication packet by the demodulation circuit 204*r*, and is output to a detector 205*r*.

In a similar manner to the detector 210*m* in the master electronic flash device 200 described above, the detector 205*r* reads in and analyzes the packed that is input from its header, and, when it has detected that the reading in has been completed of the SFD 4*b*, that is the synchronization data, it outputs a synchronization signal to a pin for synchronization timing of the CPU 206*r* as an interrupt signal. At this time, the detector 205*r* outputs this synchronization signal only if the SFD 4*b* that has been read in agrees with a data string that is set in advance. Due to this, it is possible to prevent erroneous operation if signal interference with some other communication occurs.

Furthermore, the detector 205*r* outputs the communication packet that has been read in to a buffer memory 207*r* and records it therein, and also outputs a portion of this recorded communication packet to an error detection circuit 208*r*. The error detection circuit 208*r* detects whether or not there is any error in the received communication packet on the basis of the check data for error checking included in the information 4*h*. The result of this detection is output to the CPU 206*r*.

The CPU 206*r* of the remote electronic flash device 400 starts timing when it has detected the synchronization signal interrupt from the detector 205. It decides whether or not synchronization of the start of processing by the remote electronic flash device 400 is necessary on the basis of the command 4*f* that is included in the packet stored in the buffer memory 207*r*. In concrete terms, if the command 4*f* is data that specifies a main light emission command for performing main light emission or a monitor light emission command for performing monitor light emission, then the CPU 206*r* of the remote electronic flash device 400 decides that it is necessary to synchronize the start of processing. If the CPU 206*r* has decided that the command 4*f* is neither a main light emission command nor a monitor light emission command, then it terminates the timing.

If the CPU 206*r* decides that it is necessary to synchronize the start of processing by the remote electronic flash device 400, and moreover it has decided that the result of detection by the error detection circuit 208*r* is that there is no error, then it outputs to the light emission control circuit 212*r* a signal for commanding the start of processing, after a predetermined time period, obtained from the time period information included in the information 4*h*, from detection of the synchronization signal interrupt from the detector 205*r*, in other words after a predetermined time period that has been set.

This predetermined time period that is obtained from the time period information included in the information 4*h* (the "second predetermined time period") is set to the same time period as the time period (the "first predetermined time period") from detection, as described above, of the synchronization signal interrupt by the CPU 206*m* of the master electronic flash device 200 and the CPU 306 of the main camera 300, to the time when processing starts. Due to this, it is possible to synchronize the timing of the starts of processing by the master electronic flash device 200 and the camera 300, and the start of processing by the remote electronic flash device 400. Moreover, even if a plurality of remote electronic flash devices 400 is present, since the CPU 206*r* of each of these remote electronic flash devices 400 is able to start processing at the same time. Accordingly, it is also possible to establish synchronization of the timing of starting of processing between the various remote electronic flash devices 400 at high accuracy.

On the other hand, if it has been decided that it is not necessary to establish synchronization of the start of processing by the remote electronic flash device 400, or if it has been detected that the result of detection by the error detection circuit 208*r* is that an error has occurred, then the CPU 206*r* does not output any signal for commanding the start of processing by the light emission control circuit 212*r*.

Furthermore if, as when performing the main light emission, it is necessary to establish synchronization of the start timing of processing by the remote electronic flash device 400 with the start timings of both the master electronic flash device 200 and the camera 300, then it may be arranged to set the second predetermined time period to a time period that takes into account the above described reception delay time period. By doing this, it is possible to establish synchronization between the processing of the master electronic flash device 200, the camera 300, and the remote electronic flash device 400 at high accuracy.

It should be understood that, while in the example explained above the method has been explained in which synchronization of the processing start timings is set up when a communication packet is created by the CPU 206*m* of the master electronic flash device 200 and is transmitted to the remote electronic flash device 400, processing is also performed by similar steps when a communication packet is generated by the CPU 206*r* of the remote electronic flash device 400 and is transmitted to the master electronic flash device 200.

Next, a concrete example of processing in this embodiment will be explained. First, when the power supply of the master electronic flash device 200 is turned ON, the CPU 206m of the master electronic flash device 200 creates and transmits a search packet as shown in FIG. 6, and detects any remote electronic flash device 400 that is present within communication range by receiving a response from that remote electronic flash device 400. In other words, if a search command has been stored as the command 4f in the buffer memory 207r by the remote electronic flash device 400 that has received the search packet, then its CPU 206r creates a packet that specifies its own existence, and transmits this packet to the master electronic flash device 200. It should be understood that "0" specifying the all-device ID described above is designated in the opposite party ID 4g, in order for it to be acceptable for a packet with the same contents to be transmitted to all of the remote electronic flash devices 400.

Figure 7:
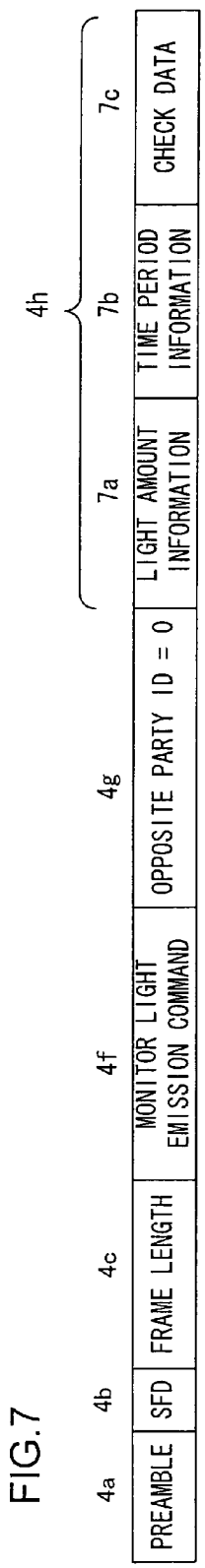
FIG. 7 is a diagram showing a concrete example of a monitor light emission starting packet.

Thereafter, when the CPU 306 of the camera 300 has detected that the release switch 307 of the camera 300 has been depressed by the user, this detection signal is output to the CPU 206m of the master electronic flash device 200. Moreover, the CPU 306 transmits to the CPU 206m light emission control information for controlling the various electronic flash devices. And the CPU 206m of the master electronic flash device 200 creates and transmits a monitor light emission starting packet for commanding the remote electronic flash devices 400 to perform monitor light emission. FIG. 7 is a figure showing a concrete example of such a monitor light emission starting packet.

As shown in this FIG. 7, data that specifies a monitor light emission command is set as the command 4f, and the information 4h includes light amount information 7a that specifies the amount of light during the monitor light emission, time period information 7b that specifies a time period that corresponds to the second predetermined time period described above, and check data 7c for error checking. The light amount information 7a and the time period information 7b are generated on the basis of the light emission control information that has been input by the CPU 306 of the camera 300. It should be understood that "0", that specifies the all-device ID, is designated as the opposite party ID 4g in the monitor light emission starting packet, since it is acceptable for the same light amount information 7a during monitor light emission and time period information 7b and so on to be ordered for all of the remote electronic flash devices 400.

In each of the electronic flash devices 400 that has received this monitor light emission starting packet, the CPU 206r starts timing when it has detected input of a synchronization signal (i.e. an interrupt signal) from its detector 206r. If it has been decided, on the basis of the error detection result from the error detection circuit 208r, that there is no error in the communication packet, then, after the second predetermined time period that is designated by the time period information 7b stored in the buffer memory 207r has elapsed, the CPU outputs a command to the light emission control circuit 212r for monitor light emission to be performed with the amount of light designated in the light amount information 7a. On the basis of the command from the CPU 206r, the light emission control circuit 212r performs monitor light emission by causing the xenon tube 213r to emit light.

When monitor light emission is performed by the remote electronic flash device 400, the amount of light during this monitor light emission is monitored by the photometric sensor 304 that is mounted to the camera 300, and the result of this measurement is output to the CPU 306. It should be understood that the CPU 306 of the camera 300 performs photometry after the first predetermined time period that is determined in advance has elapsed. The CPU 306 of the camera 300 sets the first predetermined time period and the second predetermined time period in advance, so that the timing of the monitor light emission and the photometric timing agree with one another.

If the CPU 306 of the camera 300 has decided that the amount of light measured by the photometric sensor 304 is insufficient so that the S/N of the data that specifies the photometric value is bad, then it transmits to the CPU 206m of the master electronic flash device 200 light emission control information that indicates that a monitor light emission starting packet should be created again, now with the amount of light specified by the light amount information 7a made greater than the time before. The CPU 206m performs processing to create a monitor light emission packet again, and to emit a signal for a monitor light emission command to the remote electronic flash devices 400 again. On the other hand, if the amount of light measured by the photometric sensor 304 is too great so that its photometric range has been exceeded, then the CPU 306 of the camera 300 transmits to the CPU 206m light emission control information that indicates that a monitor light emission starting packet should be created again, now with the amount of light specified by the light amount information 7a made less than the time before. The CPU 206m performs processing to create a monitor light emission packet again, and to emit a signal for a monitor light emission command to the remote electronic flash devices 400 again.

Figure 8:
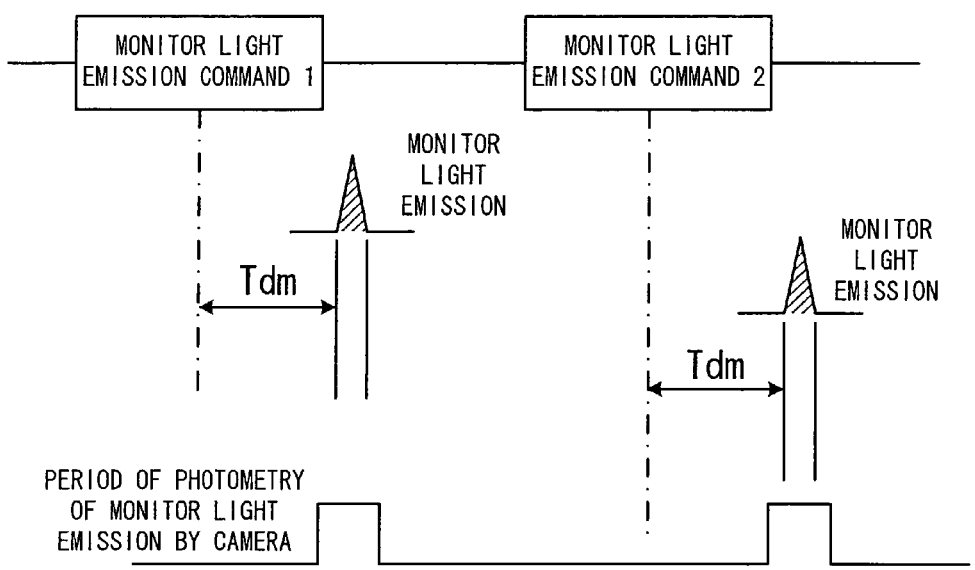
FIG. 8 is a diagram showing the flow of processing during monitor light emission.

In other words, as shown in FIG. 8, the emission of monitor light is repeated until an adequate photometric result is obtained. It should be understood that, in the example shown in FIG. 8, there is shown a case in which the CPU 206m executes processing so as again to transmit a monitor light emission starting packet including a monitor light emission command 2 and to perform photometry, since the photometric result based upon the monitor light emission command 1 has not been satisfactory.

If the CPU 306 of the camera 300 has decided that an adequate photometric result has been obtained, then it calculates the amount of light that is required for the main light emission, on the basis of the amount of light during the monitor light emission that has been measured by the photometric sensor 304 of the camera 300. It should be understood that, if the main light emission is performed by a per se known TTL method, then the CPU 306 calculates the amount of light that is needed for the main light emission as a ratio with respect to the result of measurement of the amount of light during the monitor light emission. The ratio that is calculated in this way is termed the "light emission gain". On the basis of the result of this calculation, the CPU 306 transmits light emission control information to the CPU 206m of the master electronic flash device 200. Then the CPU 206m creates a light emission gain command packet for the remote electronic flash devices 400 on the basis of this light emission control information. In this light emission gain command packet, there is included control information during light emission, such as the amount of light that is needed for the main light emission and so on.

Figure 9:
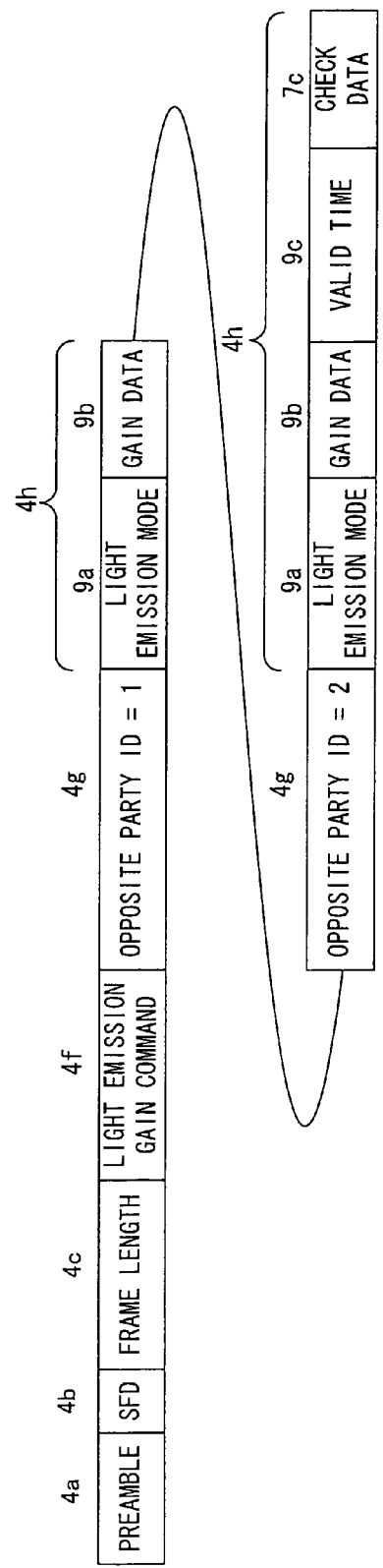
FIG. 9 is a diagram showing a concrete example of a light emission gain command packet.

FIG. 9 is a diagram showing a concrete example of a light emission gain command packet. In this light emission gain command packet, data that specifies a light emission gain command is set in the command 4f, and the information 4h includes a light emission mode 9a, gain data 9b, a valid time 9c, and check data 7c. Here, the light emission mode 9a is data that specifies a mode for the main light emission, and, for example, the TTL mode may be specified, and this means the TTL method described above. Moreover, apart from this, various other modes may also be specified, such as a manual light emission mode in which light emission is specified as a fixed amount of emitted light, a repeating light emission mode in which emission of fixed amount of light that has been selected is performed repeatedly for just a designated number of times, a modeling light emission mode in which emission of a minute amount of light is performed at a short light emission period (around 60 Hz) for around 1 to 2 seconds, and the like.

Furthermore, in the gain data 9b, there is specified an amount of light that is required for the main light emission, in other words, a light emission gain is designated, calculated by the CPU 306 of the camera 300 on the basis of the result of measurement of the amount of light during the monitor light emission is designated. The light emission gain also includes data that indicates no light emission. It should be understood that sometimes the light emission mode 9a and the gain data 9b are different for each one of the remote electronic flash devices 400 and accordingly each individual ID is designated within a communication packet and the light emission mode 9a and the gain data 9b are designated for each individual ID. In this manner, it is possible to include control information for separately controlling each one of the remote electronic flash devices 400 within a communication packet.

At this time, although it may be considered to generate and to transmit light emission gain command packets separately for each of the remote electronic flash devices 400, in this case, it is necessary to perform communication from the preamble 4a on the side of the master electronic flash device 200 for each of the light emission gain command packets, and this causes a loss of time. Accordingly, in this embodiment, as shown in FIG. 9, the occurrence of loss of time is prevented by designating a light emission mode 9a and gain data 9b for each individual ID within a single light emission gain packet.

The valid time 9c is a value that designates a valid time for the light emission gain command packet. The CPU 206r of each of the remote electronic flash devices 400 determines whether or not to execute processing on the basis of the command 4f, on the basis of the valid time that is set by this valid time 9c. In other words, if a main light emission starting packet for commanding the start of main light emission, as will be described herein after, has been received during the interval from reception of the light emission gain command packet until its valid time lapses, then the CPU 206r performs processing for main light emission. By contrast, if the CPU 206r does not receive any main light emission starting packet during the interval from reception of the light emission gain command packet until its valid time 9c lapses, then it does not perform processing for main light emission. It should be understood that a time period of around 100 msec~500 msec is set as the valid time.

Figure 10:
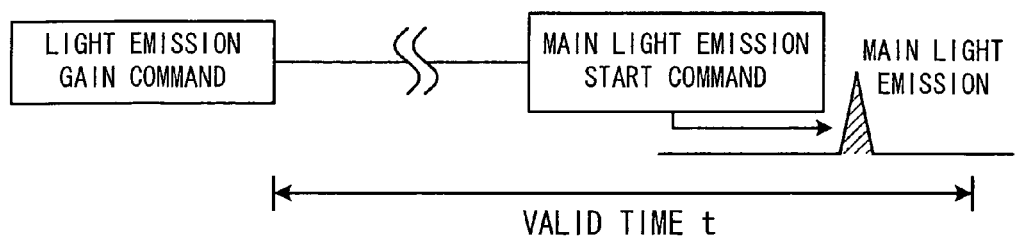
FIG. 10 is a diagram showing the flow of processing from transmission of the light emission gain command packet, to main light emission.

For example, as shown in FIG. 10, the CPU 206r of each of the remote electronic flash devices 400 performs main light emission, only if it has received a main light emission starting packet during the time period t of validity from when the light emission gain command packet is received.

By doing as described above, it is possible to limit the time period from the reception of the light emission gain command packet by the remote electronic flash device 400 until its reception of the main light emission start command, to within a time period that substantially corresponds to the transmission time interval of the light emission gain command packet and the main light emission start command by the master electronic flash device 200. As a result, it is possible to prevent erroneous operation of the remote electronic flash device 400 being caused, because of picking up communication with some other system. It should be understood that the light emission mode 9a, the gain data 9b, and the valid time 9c are generated on the basis of the light emission control information that has been input by the CPU 306 of the camera 300.

Upon reception of this light emission gain command packet, the CPU 206r in the receiving remote electronic flash device 400 executes processing according to the flow shown in FIG. 11. Namely, in a step S10, the CPU waits until reading from the buffer memory 207 of the command 4f included in the received communication packet is completed. Then the flow of control proceeds to a step S20, in which a decision is made as to whether or not the command 4f that has been read in is data that specifies a light emission gain command. If it is not data that specifies a light emission gain command, then processing terminates. By contrast, if it is data that specifies a light emission gain command, then the flow of control proceeds to a step S30.

In this step S30, the present time instant is stored as a reference time instant for timing the valid time of the main light emission start command. Then the flow of control proceeds to a step S40, in which the system waits until the reading in from the buffer memory 207r of the opposite party ID 4g has been completed, and then the flow of control proceeds to a step S50. In this step S50, a decision is made as to whether or not the opposite party ID 4g agrees with the ID of this remote electronic flash device 400. If it is decided that these two IDs do not agree with one another, then it is decided that the data that is stored in the buffer memory 207r is not data that was directed to this device 400, and the flow of control proceeds to a step S60. In this step S60, the light emission mode 9a and the gain data 9b that has been set for this opposite party ID 4g are read in to be discarded from the buffer memory 207r, and then the flow of control proceeds to a step S70.

In the step S70, a decision is made as to whether or not the data that has been read in to be discarded is the final data included in the light emission gain command packet. For example if, as described in FIG. 9 above, the data 4h is specified for each individual ID, then it may be decided whether or not the data that has been read in to be discarded is data that is addressed to the final individual ID included in the packet. If the result of the decision is that it is decided that the data that has been read in to be discarded is the final data, then processing terminates. By contrast, if it is decided that this is not the final data, then the flow of control returns to the step S50.

On the other hand, if in the step S50 it is decided that the opposite party ID 4g agrees with the ID of this remote electronic flash device 400, then it is decided that the data that is stored in the buffer memory 207r is data that is addressed to this device 400, and the flow of control proceeds to a step S80. In this step S80, the system waits until the reading in of the light emission mode 9a and the gain data 9b stored in the buffer memory 207r is completed, and then the flow of control proceeds to a step S90. In this step S90, control parameters during the main light emission (the main light emission control parameters) are set on the basis of the light emission mode 9a and the gain data 9b that have been read in, and then the flow of control proceeds to a step S100.

In the step S100, a decision is made as to whether or not this data that is addressed to this device 400 is the above described final data included in the light emission gain command packet. If it is decided that this is the final data, then processing terminates. By contrast, if it is decided that this is not the final data, then the flow of control returns to the step S50.

Figure 12A:
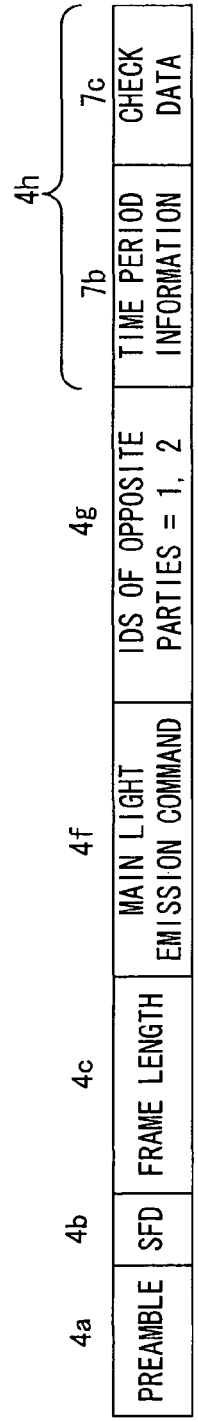
FIGS. 12A and 12B are diagrams each showing a concrete example of a main light emission starting packet.
Figure 12B:
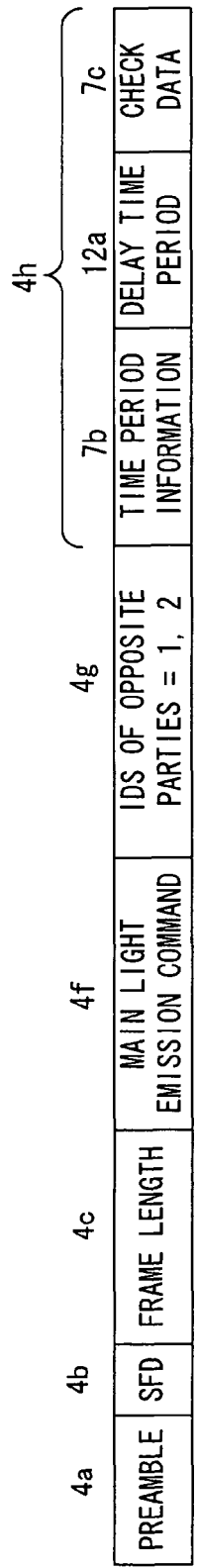

In the master electronic flash device 200, the CPU 206m further creates a main light emission starting packet, as shown in FIGS. 12A and 12B. It should be understood that FIG. 12A shows main light emission packet in the case that the reception delay time period described above has not been taken into account, while FIG. 12B shows the main light emission packet in the case that the reception delay time period has been taken into account. These two differ in whether or not a reception delay time period 12a for specifying the reception delay time period is included in the information 4h. Here it is supposed that the reception delay time period is not to be taken into account, so that the case will be explained in which the CPU 206m creates the main light emission starting packet shown in FIG. 12A.

In the main light emission starting packet, data is set in the command 4f that specifies a main light emission command. Since this main light emission starting packet is a packet for commanding the start of main light emission on the basis of the light emission gain command packet that is transmitted in advance, only the above described time period information 7b and check data 7c are included in its information 4h. Moreover, the same time period information 7b and check data 7c may be commanded to all of the remote electronic flash devices 400. Accordingly, in order to designate all of the remote electronic-flash devices 400, "1" and "2" are set in the opposite party ID 4g. Alternatively, as described above, it would also be acceptable to arrange to designate "0" as the opposite party ID 4g, so as to specify the all-device ID.

Figure 13:
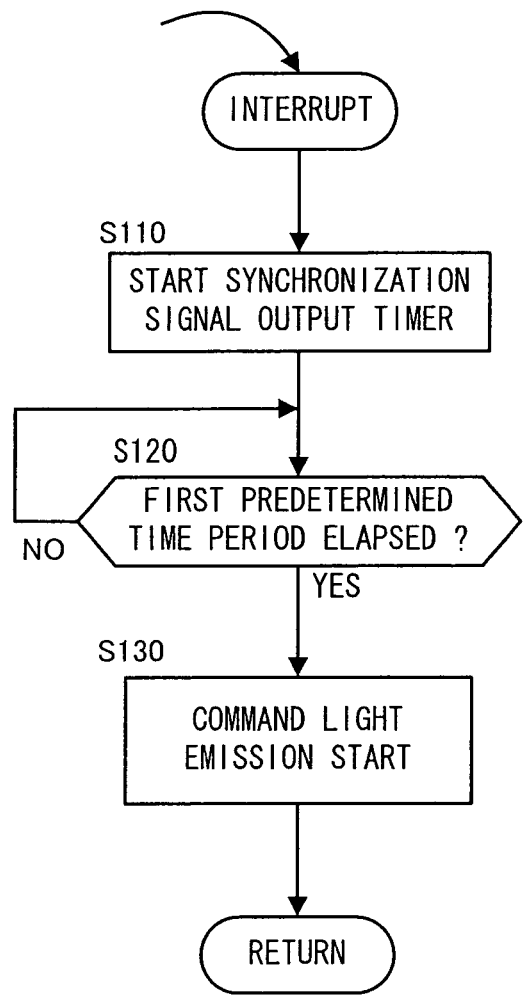
FIG. 13 is a flowchart showing processing performed by the master electronic flash device 200 for transmission of the main light emission starting packet.

In order to make the timings of the main light emission and of the remote electronic flash devices 400 to which the main light emission starting packet is transmitted agree with one another, the CPU 206m of the master electronic flash device 200 starts timing at the time point at which the SFD 4b is detected by the detector 210m, and starts the main light emission after a predetermined time period (the first predetermined time period) has elapsed. FIG. 13 is a flowchart showing the processing performed by the CPU 206m in the master electronic flash device 200 for transmission of a main light emission starting packet.

In a step S110, a timer is started when it is detected that a synchronization signal (an interrupt signal) has been input from the detector 210m. At this time, the synchronization signal is output via the X terminal 2a to the pin for synchronization timing of the CPU 306 of the camera 300. Then the flow of control proceeds to a step S120. In this step S120, a decision is made as to whether or not the above described first predetermined time period has elapsed from when the timer started. If it has been decided that the first predetermined time period has elapsed, then the flow of control proceeds to a step S130 in which the light emission control circuit 212m is commanded to start light emission, and then the processing terminates. It should be understood that, in the camera 300, the CPU 306 commands the shutter drive device 305 to open the shutter 302 after the above described first predetermined time period has elapsed from when the synchronization signal is input.

Figure 14:
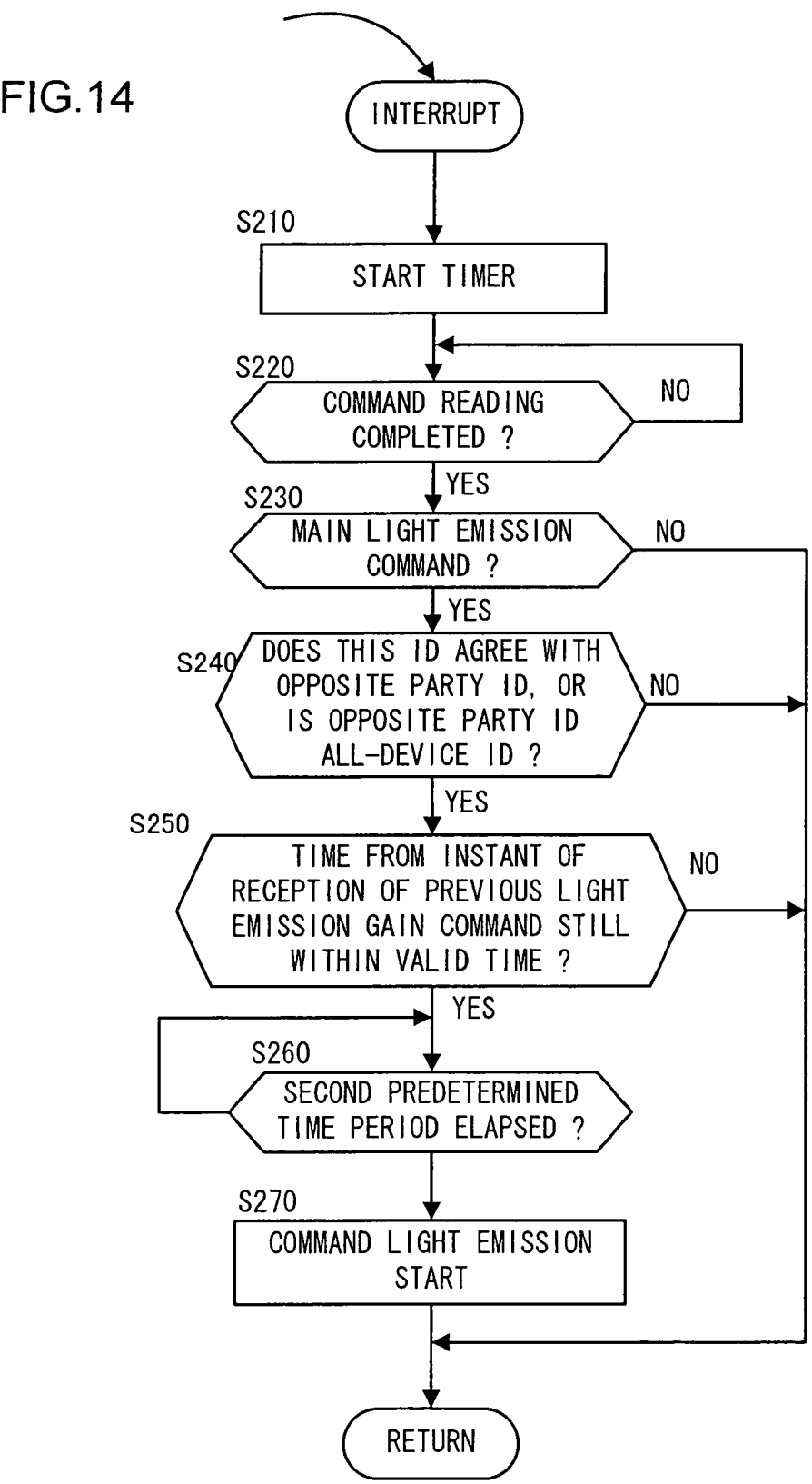
FIG. 14 is a flowchart showing processing performed by the remote electronic flash device 400 upon receipt of the main light emission starting packet.

Furthermore, in each of the remote electronic flash devices that has received this main light emission start command, the CPU 206r executes the processing shown in FIG. 14. It should be understood that the CPU 206r does not execute the processing shown in FIG. 14, if it does not receive the above described light emission gain command packet beforehand.

In a step S210, the CPU 206r starts a timer if it has detected that a synchronization signal (an interrupt signal) has been input from the detector 205r, and then the flow of control proceeds to a step S220. In this step S220, the system waits until the command 4f included in the received communication packet is read in from the buffer memory 207r. Then the flow of control proceeds to a step S230, in which a decision is made as to whether or not the command 4f that has been read in is data that specifies a main light emission command. If it is not data that specifies a main light emission command, then processing terminates. By contrast, if it is data that specifies a main light emission command, then the flow of control proceeds to a step S240.

In the step S240, a decision is made as to whether or not either the opposite party ID 4g that is stored in the buffer memory 207r agrees with the ID of this device 400, or the opposite party ID 4g is the all-device ID. If neither the opposite party ID 4g is the ID of this device 400 nor it is the all-device ID, then processing terminates. By contrast, if the opposite party ID 4g is either the ID of this device 400 or the all-device ID, then the flow of control proceeds to a step S250.

In the step S250, a decision is made as to whether or not the system is still within the valid time designated by the above described valid time 9c from the time when the light emission gain command packet is received. In other words, a decision is made as to whether or not the elapsed time from the time instant of storage in the step S30 of FIG. 11 is still within the valid time. If it has been decided that a time period greater than or equal to the valid time has elapsed, then a decision is made that the abovementioned main light emission start command is invalid, and processing terminates. On the other hand, if it has been decided that the elapsed time is still within the valid time, then this main light emission start command is accepted and the flow of control proceeds to a step S260.

In the step S260, a decision is made as to whether or not the predetermined time period designated in the time period information 7b (the second predetermined time period) has elapsed. When it has been decided that this predetermined time period has elapsed, then the flow of control proceeds to a step S270, and the light emission control circuit 212r is commanded to start light emission. Then processing terminates.

Figure 15:
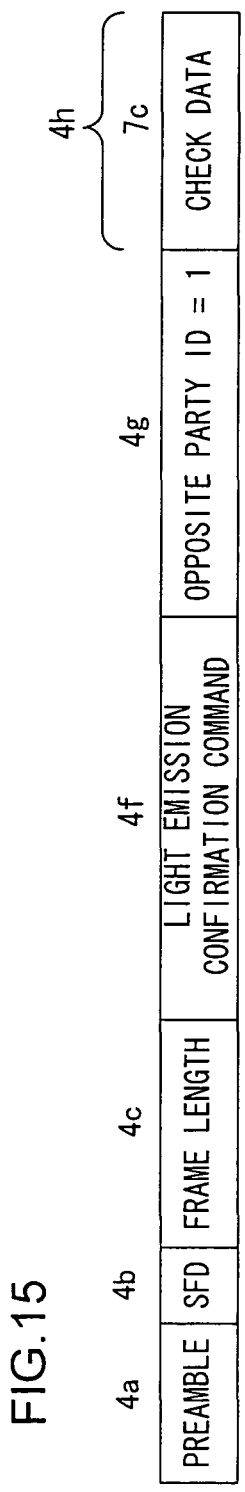
FIG. 15 is a diagram showing a concrete example of a light emission confirmation packet.

After the main light emission has been completed, the CPU 206m of the master electronic flash device 200 creates and transmits, for example, the light emission confirmation packet shown in FIG. 15 in order to cause the remote electronic flash devices 400 to report the conditions of light emission in the main light emission. In this light emission confirmation packet, the command 4f is a light emission confirmation command. Moreover, this light emission confirmation packet is transmitted individually to each of the remote electronic flash devices 400. The packet shown in FIG. 15, in which the opposite party ID 4g is "1", is an example in which that remote electronic flash device 400 whose individual ID is "1" is taken as the subject.

Figure 16:
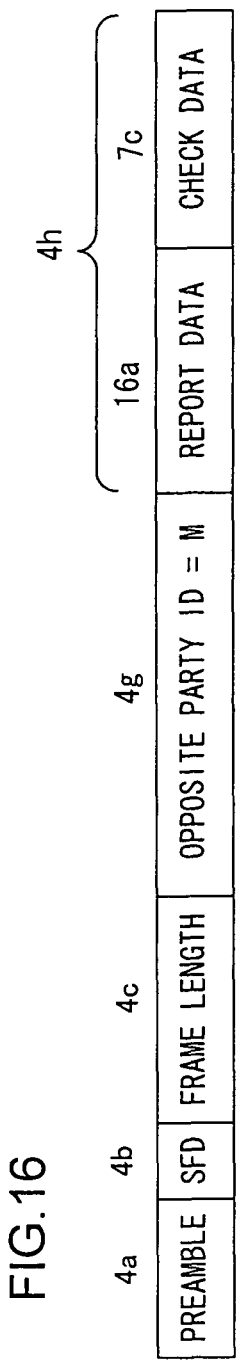
FIG. 16 is a diagram showing a concrete example of a report packet.

The CPU 206r of each of the remote electronic flash devices 400 that has received one of these light emission confirmation packets creates a report packet, as shown for example in FIG. 16, and thereby reports the conditions of light emission during the main light emission to the master electronic flash device 200. This report packet is a packet for transmitting to the master electronic flash device 200 report data 16a as information that specifies the conditions of light emission during the main light emission, and no command 4f is included, since it is not a packet for ordering the master electronic flash device 200 to perform any processing. Moreover, in the opposite party ID 4g, there is specified an ID that designates the master electronic flash device 200, for example "M".

As the report data 16a, for example, there may be reported (1) information that specifies that the main light emission was not performed, since no main light emission command was detected within the valid time, or (2) information that specifies that full light emission was performed, since the target amount of light that was specified by the gain data 9b of the light emission gain command packet was greater than the amount of light that could be emitted by the remote electronic flash device 400, or the like. Moreover, it would also be acceptable to arrange to report (3) information related to the difference between the target amount of light during the main light emission and the actual amount of light that was generated.

Figure 17:
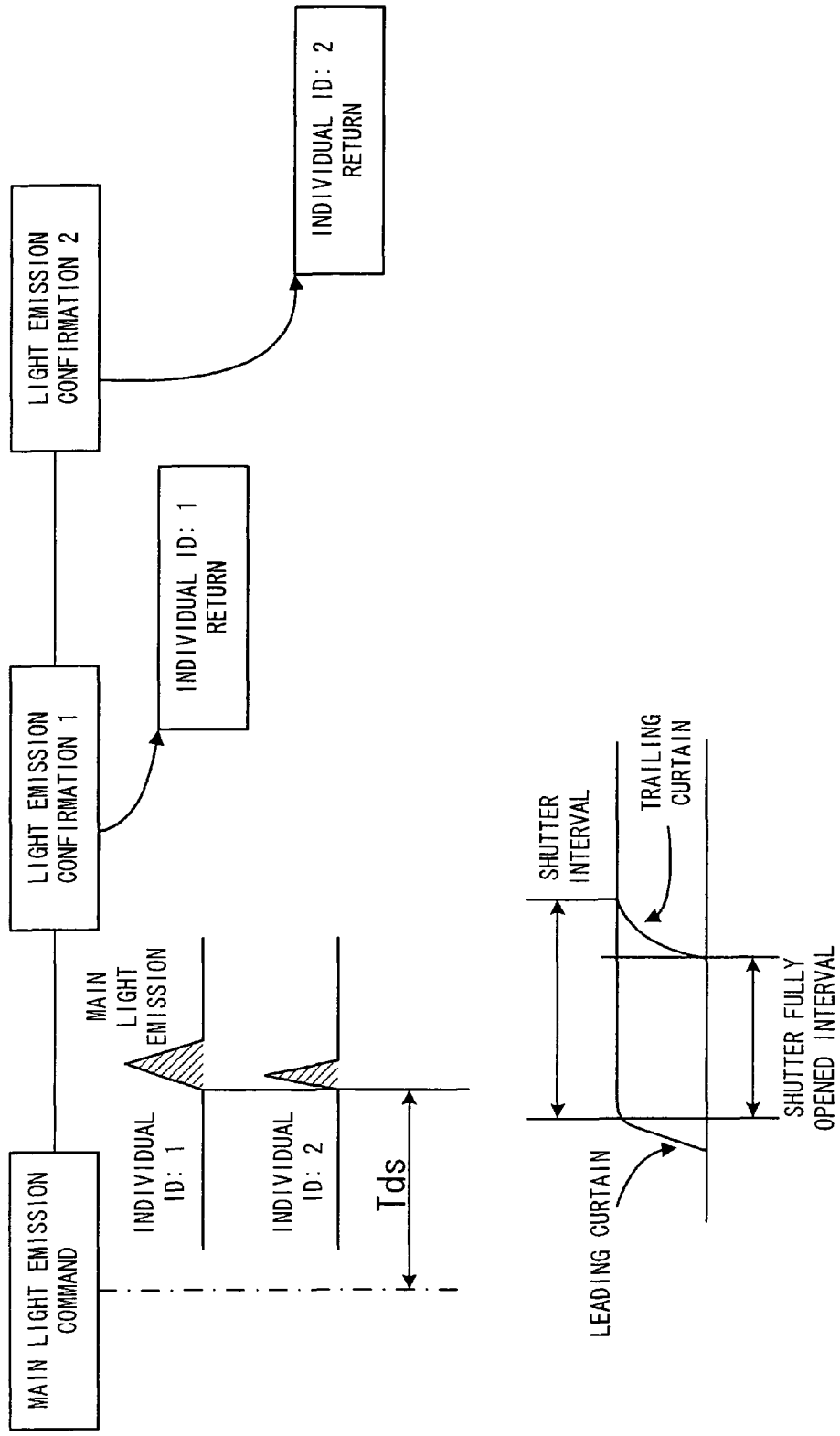
FIG. 17 is a diagram showing the flow of processing when a main light emission starting packet has been transmitted.

FIG. 17 is a figure showing the flows of processing in the camera 300 and a remote electronic flash device 400 when a main light emission starting packet has been transmitted. When a main light emission start command is transmitted from the master electronic flash device 200, after the predetermined time period Tds has elapsed, the two remote electronic flash devices 400 (whose individual IDs are "1" and "2") start their main light emissions. At the same time, in the camera 300, the shutter drive device 305 opens the shutter 302 for a fixed time period. If the light emission mode is the TTL mode, the manual light emission mode, or the repeating light emission mode, then the main light emission is performed during the interval from when the leading curtain of the shutter 302 is completely opened to before the trailing curtain starts to close. Thereafter, a light emission confirmation packet is transmitted from the master electronic flash device 200 to the remote electronic flash device whose individual ID is "1", and a report (a return) is obtained from that remote electronic flash device whose individual ID is "1". Moreover, a light emission confirmation packet is transmitted from the master electronic flash device 200 to the remote electronic flash device whose individual ID is "2", and a report (a return) is obtained from that remote electronic flash device whose individual ID is "2".

According to this embodiment as explained above, the following beneficial operational effects may be obtained.

(1) It is arranged for the detectors 205m and 210m of the master electronic flash device 200 and the detectors 205r and 210r of the remote electronic flash devices 400 to detect the synchronization data, and to output synchronization signals to the CPU 206m or the CPU 206r respectively, before all of the communication packet has been read in. Due to this, even if the time periods required for all of the communication packet to be read in are different, it is nevertheless possible to output the synchronization signals before this, so that it is possible to establish synchronization between the starts of processing by the master electronic flash device 200 and the remote electronic flash devices 400 at high accuracy.

(2) It is arranged for the detectors 205m, 210m, 205r, and 210r to detect the SFD 4b as synchronization data included in the communication packet. As a result, it is sufficient to detect data included within the communication packet that has a specific meaning (specified data) as synchronization data and accordingly there is no requirement to include special data in the packet as synchronization data.

(3) It is arranged for the CPU 206m of the master electronic flash device 200 to command starting of the necessary processing on the basis of the command 4f, after the first predetermined time period from detection of the interrupt of the synchronization signal from the detector 210m. Moreover, it is arranged for the CPU 306 of the camera 300 to command starting of the necessary processing, after the first predetermined time period from detection of the interrupt of the synchronization signal from the CPU 206m of the master electronic flash device 200. Furthermore, it is arranged for the CPU 206r of the remote electronic flash device 400 to command the light emission control circuit 212r to start processing, after the second predetermined time period (that is, the same as the first predetermined time period) from detection of the interrupt of the synchronization signal from the detector 205r. As a result, it is possible to establish synchronization between the starting timings of the processing of the master electronic flash device 200, the camera 300, and the remote electronic flash device 400 at high accuracy. For example, it is possible to make the starting timings of the processing of the master electronic flash device 200, the camera 300, and the remote electronic flash device 400 be simultaneous. Moreover, it is possible to enhance the accuracy of synchronization of the starting timings of the processing of the master electronic flash device 200, the camera 300, and the remote electronic flash device 400 by making the second predetermined time period be different from the first predetermined time period, by taking into account a delay time period such as a decoding time period or the like.

(4) When a main light emission starting packet has been transmitted from the master electronic flash device 200, it is arranged for the master electronic flash device 200 to start the main light emission after the first predetermined time period has elapsed, for the camera 300 to open the shutter 302 after the first predetermined time period has elapsed, and for the remote electronic flash device 400 to start its main light emission after the second predetermined time period has elapsed. As a result, it is possible to make the timing of the photography by the camera 300, and the timing of the main light emission by the master electronic flash device 200 and the remote electronic flash device 400 agree with one another.

(5) When a monitor light emission starting packet has been transmitted from the master electronic flash device 200, it is arranged for the camera 300 to start photometry after the first predetermined time period has elapsed, and for the remote electronic flash device 400 to start its monitor light emission after the second predetermined time period has elapsed. As a result, it is possible to make the timing of the photometry by the camera 300, and the timing of the monitor light emission by the remote electronic flash device 400 agree with one another.

(6) It is arranged for the synchronization signal that is output from the detector 205m or 210m to be input to the interrupt terminal of the CPU 206m. Moreover, it is arranged for the synchronization signal that is output from the CPU 206m to be input to the interrupt terminal of the CPU 306. Furthermore, it is arranged for the synchronization signal that is output from the detector 205r or 210r to be input to the interrupt terminal of the CPU 206r. As a result, it is possible for the CPUs 206m, 206r, and 306 to detect the synchronization signal at high speed.

(7) It is arranged for each of the remote electronic flash devices 400 only to perform its main light emission if it has received a main light emission starting packet during the interval from when the light emission gain command packet is received until the valid time that is specified in the valid time 9c elapses. Due to this, it is possible to limit the time period, from reception of the light emission gain command packet by the remote electronic flash device 400 until its reception of the main light emission start command, to within a time period that substantially corresponds to the transmission interval of the light emission gain command packet and the main light emission start command from the master electronic flash device 200, so that it is possible to prevent interference from communication with some other system causing the remote electronic flash devices 400 to perform mistaken operation.

(8) After the main light emission has been completed, it is arranged for a light emission confirmation packet to be transmitted from the master electronic flash device 200 to the remote electronic flash devices 400, so as to cause each of the remote electronic flash devices 400 to report its conditions of light emission during the main light emission. Due to this, it is possible for the master electronic flash device 200 and the camera 300 to ascertain the conditions of light emission of each of the remote electronic flash devices 400.

(9) As the opposite party ID that is included in a communication packet, it is arranged for it to be possible to set either individual IDs for designating the remote electronic flash devices 400 individually, or the all-device ID for designating all of them at once. Due to this, when transmitting a packet having the same contents to all of the remote electronic flash devices 400, it is possible to set the all-device ID and to transmit to them all at once.

(10) It is arranged for it to be possible to include a plurality of opposite party IDs 4g within a single communication packet, to designate individual ones of the remote electronic flash devices 400 by them, and to specify individual control information for each of these individual IDs. Due to this, it is possible to prevent the occurrence of loss of an amount of time equivalent to the product of the number of light emission gain command packets that are generated when creating and transmitting light emission gain command packets to each of the remote electronic flash devices 400 individually, and the communication time period for the preamble 4a.

(11) It is arranged to include, as the light amount information 7a in a monitor light emission starting packet, information for commanding the amount of light during monitor light emission, and to include, as the gain data 9b in a light emission gain packet, information for commanding the amount of light during main light emission. Due to this, it is possible to command, from the master electronic flash device 200, the amount of light to be emitted by each of the remote electronic flash devices 400 during the monitor light emission and the main light emission.

MODIFICATIONS

It should be understood that the light emission control system of the embodiment described above may be varied in the following ways.

(1) In the embodiment described above, an example has been explained in which, when a communication packet is transmitted from the master electronic flash device 200, and when the SFD 4b has been detected by the detector 210m, the synchronization signal is input to an interrupt terminal of the CPU 206m. However, it would also be acceptable to arrange, not for the synchronization signal to be detected by an interrupt in this manner, but for the CPU 206m to detect input of the synchronization signal by polling. In other words, when a communication packet is transmitted from the master electronic flash device 200, since it is not necessary for the CPU 206m to execute any other processing apart from the transmission processing, it is possible to utilize most of the CPU processing time for detection of input of the synchronization signal. Accordingly it would be acceptable to arrange for the CPU 206m, after the start of transmission processing of a communication packet, to monitor continuously for input of an interrupt signal from the detector 210m. In a similar manner, it would also be acceptable to arrange for the CPU 306 of the camera 300 and the CPUs 206r of the remote electronic flash devices 400 also to detect the input of the synchronization signal by polling.

(2) In the embodiment described above, it is arranged for the detectors 205m, 210m, 205r, and 210r to detect the SFD 4b as the synchronization data. However, when data other than this has been read in after detection of the SFD 4b, for example when a predetermined amount of data (i.e. a predetermined number of bits of data) has been read in after the SFD 4b, it would also be acceptable to arrange to detect this data as the synchronization data.

(3) In the embodiment described above, a case has been explained in which the external device is supposed to be a remote electronic flash device 400, and the timing of photometry by the camera 300 and the timing of monitor light emission by the remote electronic flash device 400 are synchronized together, as well as the synchronization of the timing of the main light emission by the master electronic flash device 200, the timing of opening of the shutter 302 of the camera 300, and the timing of the main light emission by the remote electronic flash device 400, all being synchronized together. However, it would also be acceptable to use a camera (i.e. an external camera) as the external device. In this case, it would be acceptable to arrange to establish synchronization of the main light emission by the master electronic flash device 200, the timing of opening of the shutter 302 of the camera 300, and the timing of opening of a shutter 302 of the camera that is the external device, in order to photograph the same photographic subject with a plurality of cameras.

(4) In the embodiment described above, an example has been explained in which a monitor light emission command is designated by the command 4f in the monitor light emission starting packet, a main light emission command is designated by the command 4f in the main light emission starting packet, and the CPU 206r of the remote electronic flash device 400 performs either monitor light emission or main light emission, according to the command designated by this command 4f. However, it would also be acceptable to arrange for the command 4f to be a light emission command in either case, and for the CPU 206r to decide whether a communication packet is a monitor light emission starting packet or a main light emission starting packet, according to the difference of the opposite party ID 4g. In other words, it would be acceptable, as described above, for the light amount information 7a and the time period information 7b and so on in the case of monitor light emission to be commanded to be the same for all of the remote electronic flash devices 400. By doing this, it is arranged for the CPU 206m of the master electronic flash device 200 to designate the all-device ID in the opposite party ID 4g in the monitor light emission starting packet, and to designate an individual ID in the opposite party ID 4g in the main light emission starting packet. If an individual ID is designated in the opposite party ID 4g in some communication packet, then the CPU 206r of the remote electronic flash device 400 may decide that this communication packet is a main light emission packet, while, if the all-device ID is designated in the opposite party ID 4g, then it may decide that this communication packet is a monitor light emission starting packet.

(5) In the embodiment described above, an example has been explained in which the master electronic flash device 200 and the remote electronic flash device 400 are equipped with internal wireless modules. However, it would also be acceptable to arrange for wireless modules to be detachably fitted to the master electronic flash device 200 and the remote electronic flash device 400. Moreover, although an example has been explained in which, in the camera 300 with the master electronic flash device 200 provided thereto, the wireless module is provided to the master electronic flash device 200, it would also be acceptable to arrange for the wireless module to be provided to the camera 300. In this case, it would also be acceptable to arrange for the wireless module to be housed internally to the camera 300, or to be detachably fitted to the camera 300.

The above described embodiments are examples and various modifications can be made without departing from the scope of the invention.

What is claimed is:

1. An external device that is wirelessly connected to an information communication device, comprising:
a synchronization data creation unit that outputs synchronization data used for establishing synchronization of timing of processing related to photography;
a packet creation unit that (1) creates a communication packet including control information directing the processing related to photography and that (2) is adapted to create a communication packet including the synchronization data and the control information when the synchronization data creation unit has output the synchronization data;
a packet output unit that outputs the communication packet to the exterior by wireless communication;
a packet reception unit that receives the communication packet;
a detection unit that detects the synchronization data before all of the communication packet received by the packet reception unit has been read in; and
a signal output unit that outputs a synchronization signal used for establishing synchronization of the timing of the processing related to photography on the basis of detection by the detection unit of the synchronization data, wherein
the synchronization data is data including a start of frame delimiter or is data including a predetermined number of bits after the start of frame delimiter in the communication packet.

2. An external device according to claim 1, further comprising a detachable wireless communication unit, including at least the packet reception unit, for performing wireless communication with the information communication device.

3. An external device according to claim 1, wherein the synchronization data comprises a start of frame delimiter.

4. An external device that is wirelessly connected to a camera, comprising:
a synchronization data creation unit that outputs synchronization data used for establishing synchronization of timing of processing related to photography;
a packet creation unit that (1) creates a communication packet including control information directing the processing related to photography and that (2) is adapted to create a communication packet including the synchronization data and the control information when the synchronization data creation unit has output the synchronization data;
a packet output unit that outputs the communication packet to the exterior by wireless communication;
a packet reception unit that receives the communication packet;
a detection unit that detects the synchronization data before all of the communication packet received by the packet reception unit has been read in;
a signal output unit that outputs a synchronization signal used for establishing synchronization of the timing of the processing related to photography on the basis of detection by the detection unit of the synchronization data; and
a processing execution unit for establishing synchronization, on the basis of the synchronization data, with processing related to photography that is executed on the side of the camera, and that starts processing related to the photography that is executed on the side of the external device after a time period that is set from when the signal output unit outputs the synchronization signal.

5. An external device according to claim 4, wherein:
when the external device is an electronic flash device, the synchronization of timing of the processing related to photography is synchronization of the timing at which the camera opens a shutter with the timing at which the electronic flash device performs emission of light; and
the processing execution unit starts light emission after the time period that has been set.

6. An external device according to claim 5, wherein the processing execution unit starts light emission if it has received a communication packet commanding the start of light emission within a predetermined valid time after having read in a communication packet from the camera including control information during light emission.

7. An external device according to claim 5, wherein the external device transmits to the camera a communication packet including information specifying conditions of light emission after the light emission has ended.

8. An external device according to claim 7, wherein the information that specifies the conditions of light emission is at least one of information that specifies that the electronic flash device has performed full light emission and information related to the difference between a target amount of light during light emission and the actual amount of light that has been emitted.

9. An external device according to claim 4, wherein:
when the external device is an electronic flash device, the synchronization of timing of the processing related to photography is synchronization of the timing at which the camera starts photometry with the timing at which the electronic flash device starts a preparatory emission of light, before performing main light emission; and
the processing execution unit starts preparatory light emission after the time period that has been set.

10. An external device according to claim 4, wherein:
when the external device is an external camera, the synchronization of timing of the processing related to photography is synchronization of the timing at which the camera opens a shutter with the timing at which the external camera opens a shutter; and
the processing execution unit opens the shutter after the time period that has been set.

11. An external device according to claim 4, wherein information specifying the time period that has been set is included in the communication packet.

12. An external device that is wirelessly connected to an information communication device, comprising:
a synchronization data creation unit that outputs synchronization data used for establishing synchronization of timing of processing related to photography;
a packet creation unit that (1) creates a communication packet including control information directing the processing related to photography and that (2) is adapted to create a communication packet including the synchronization data and the control information when the synchronization data creating unit has output the synchronization data;
a packet output unit that outputs the communication packet to the exterior by wireless communication;
a packet reception unit that receives the communication packet;
a detection unit that detects the synchronization data before all of the communication packet received by the packet reception unit has been read in; and a signal output unit that outputs a synchronization signal used for establishing synchronization of the timing of the processing related to photography on the basis of detection by the detection unit of the synchronization data, wherein the signal output unit includes a control circuit provided to the external device, the synchronization data detected by the detection unit is input to an interrupt terminal of the control circuit, and the signal output unit outputs the synchronization signal on the basis of the synchronization data having been input to the interrupt terminal of the control circuit.

13. An information communication device that is wirelessly connected to an external device, comprising:

a packet reception unit that receives a communication packet including control information directing a processing related to photography and synchronization data that is used for establishing synchronization of the timing of the processing related to photography;

a detection unit that detects the synchronization data used for establishing synchronization of timing of the processing related to photography before all of the communication packet received by the packet reception unit has been read in; and a signal output unit that outputs a synchronization signal used for establishing synchronization of the timing of the processing related to photography on the basis of detection by the detection unit of the synchronization data, wherein the information communication device further comprises a synchronization data creation unit that outputs the synchronization data;

a packet creation unit that creates the communication packet; and a packet output unit that outputs the communication packet to the exterior by wireless communication; wherein the packet creation unit creates the communication packet including the synchronization data and the control information directing the processing related to photography when the synchronization data creation unit has output the synchronization data, and wherein the synchronization data is data including a start of frame delimiter or is data including a predetermined number of bits after the start of frame delimiter in the communication packet.

14. An information communication device according to claim 13, wherein:

the information communication device is a camera; and the camera further comprises a processing execution unit that starts processing related to photography executed on the side of the camera on the basis of the synchronization data output by the synchronization data creation unit, in order to establish synchronization with processing related to photography executed on the side of the external device, after a set time period from when the external device outputs the synchronization signal.

15. An information communication device according to claim 14, wherein:

when the external device is an electronic flash device, the synchronization of timing of the processing related to photography is synchronization of the timing at which the camera opens a shutter with the timing at which the electronic flash device performs emission of light, and the processing execution unit opens the shutter on the basis of the synchronization data output by the synchronization data creation unit.

16. An information communication device according to claim 15, wherein the packet output unit outputs a communication packet that commands the start of light emission within a predetermined valid time after outputting a communication packet including control information during light emission.

17. An information communication device according to claim 15, further comprising:

a request unit that requests the external device to transmit, after the light emission ends, a communication packet including information specifying conditions of light emission by the external device.

18. An information communication device according to claim 17, wherein the information specifying the conditions of light emission is at least one of information that specifies that the electronic flash device has performed full light emission and information related to a difference between a target amount of light during light emission and an actual amount of light that has been emitted.

19. An information communication device according to claim 14, wherein:

when the external device is an electronic flash device, the synchronization of timing of the processing related to photography is synchronization of the timing at which the camera starts photometry with the timing at which the electronic flash device starts a preparatory emission of light, before performing main light emission, and the processing execution unit starts photometry on the basis of the synchronization data output by the synchronization data creation unit.

20. An information communication device according to claim 14, wherein:

when the external device is an external camera, the synchronization of timing of the processing related to photography is synchronization of the timing at which the camera opens a shutter with the timing at which the external camera opens a shutter, and the processing execution unit opens the shutter on the basis of the synchronization data output by the synchronization data creation unit.

21. An information communication device according to claim 14, wherein:

the processing execution unit includes a control circuit provided to the camera, the packet output unit includes a camera side detection unit that detects the synchronization data from the communication packet including the synchronization data, the synchronization data detected by the camera side detection unit is input to an interrupt terminal of the control circuit, and the processing execution unit determines a start timing for processing on the basis of the synchronization data, based upon the synchronization data detected by the camera side detection unit being input to the interrupt terminal of the control circuit.

22. An information communication device according to claim 14, wherein the packet creation unit creates the communication packet including information that specifies the set time period.

23. An information communication device according to claim 13, wherein when the external device includes a plurality of electronic flash devices, the packet creation unit creates the communication packet including either information for specifying each of the electronic flash devices individually, or information for specifying all of the electronic flash devices together.

24. An information communication device according to claim 13, wherein
when a plurality of the external devices is present, the packet creation unit creates the communication packet including, in the communication packet, control information for controlling each of the electronic flash devices individually.

25. An information communication device according to claim 24, wherein
when the external device is an electronic flash device, the control information includes information specifying an amount of light to be emitted by each external device.

26. An information communication device according to claim 13, wherein:
the packet creation unit creates a communication packet including control information,
the packet output unit outputs the communication packet that has been created by the packet creation unit to a plurality of external devices that are wirelessly connected, and
when a plurality of the external devices is present, the packet creation unit creates the communication packet and includes, within the communication packet, the control information for controlling each of the external devices individually.

27. An information communication device according to claim 26, wherein
when the external device is an electronic flash device, the control information is information specifying the amount of light emitted by each external device.

28. An information communication device according to claim 13, further comprising a detachable wireless communication unit, including at least the packet output unit, for performing wireless communication with the external device.

29. An external device that is wirelessly connected to a camera, comprising:
a packet creation unit that creates a communication packet including control information directing a processing related to photography and synchronization data that is used for synchronizing the timing of the processing related to photography;
a packet output unit that outputs the communication packet that has been created by the packet creation unit;
a packet reception unit that receives the communication packet and records it in a memory;
a packet analysis unit that starts to analyze information from the communication packet, the reception of which has been completed, before all of the communication packet that has been received by the packet reception unit has been recorded in the memory; and
a processing execution unit for establishing synchronization, on the basis of the synchronization data, with a processing related to photography that is executed on the side of the camera, and that starts the processing related to the photography that is executed on the side of the external device after a time period that is set from when a signal output unit of the packet analysis unit outputs a synchronization signal based on detection of the synchronization data.

30. An external device according to claim 29, wherein the packet analysis unit includes:
a detection unit that detects, from the communication packet that has been read in, the synchronization data; and
the signal output unit that outputs the synchronization signal for establishing synchronization with the timing of processing related to photography, when the synchronization data has been detected by the detection unit.

31. An external device according to claim 29, further comprising a detachable wireless communication unit, including at least the packet reception unit, for performing wireless communication with the information communication device.

32. An external device according to claim 29, wherein
the synchronization data is data including a start of frame delimiter or is data including a predetermined number of bits after the start of frame delimiter in the communication packet.

33. An external device that is wirelessly connected to a camera; comprising:
a packet creation unit that creates a communication packet including control information directing a processing related to photography and synchronization data that is used for synchronizing the timing of the processing related to photography;
a packet output unit that outputs the communication packet that has been created by the packet creation unit;
a packet reception unit that receives the communication packet and records it in a memory; and
a packet analysis unit that starts to analyze information from the communication packet, the reception of which has been completed, before all of the communication packet that has been received by the packet reception unit has been recorded in the memory, wherein
the synchronization data is data including a start of frame delimiter or is data including a predetermined number of bits after the start of frame delimiter in the communication packet.

* * * * *